United States Patent
Sasaki

(10) Patent No.: US 10,297,819 B2
(45) Date of Patent: May 21, 2019

(54) SLURRY COMPOSITION FOR LITHIUM ION SECONDARY BATTERY NEGATIVE ELECTRODE, NEGATIVE ELECTRODE FOR LITHIUM ION SECONDARY BATTERY AND METHOD FOR PRODUCING THE SAME, AND LITHIUM ION SECONDARY BATTERY

(71) Applicant: ZEON CORPORATION, Tokyo (JP)

(72) Inventor: Tomokazu Sasaki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 763 days.

(21) Appl. No.: 14/440,583

(22) PCT Filed: Nov. 8, 2013

(86) PCT No.: PCT/JP2013/080280
§ 371 (c)(1),
(2) Date: May 4, 2015

(87) PCT Pub. No.: WO2014/073647
PCT Pub. Date: May 15, 2014

(65) Prior Publication Data
US 2015/0303463 A1 Oct. 22, 2015

(30) Foreign Application Priority Data
Nov. 9, 2012 (JP) ................................. 2012-247628

(51) Int. Cl.
| | | |
|---|---|---|
| H01M 4/38 | (2006.01) | |
| H01M 10/0525 | (2010.01) | |
| H01M 4/04 | (2006.01) | |
| H01M 4/1393 | (2010.01) | |
| H01M 4/583 | (2010.01) | |
| H01M 4/62 | (2006.01) | |
| H01M 4/133 | (2010.01) | |
| H01M 4/134 | (2010.01) | |
| H01M 4/1395 | (2010.01) | |
| H01M 4/587 | (2010.01) | |
| H01M 4/02 | (2006.01) | |

(52) U.S. Cl.
CPC ......... *H01M 4/386* (2013.01); *H01M 4/0404* (2013.01); *H01M 4/133* (2013.01); *H01M 4/134* (2013.01); *H01M 4/1393* (2013.01); *H01M 4/1395* (2013.01); *H01M 4/583* (2013.01); *H01M 4/587* (2013.01); *H01M 4/622* (2013.01); *H01M 10/0525* (2013.01); *H01M 4/624* (2013.01); *H01M 2004/027* (2013.01); *H01M 2220/30* (2013.01)

(58) Field of Classification Search
CPC .......................... H01M 4/622; H01M 4/0404
See application file for complete search history.

(56) References Cited

U.S. PATENT DOCUMENTS

| | | | |
|---|---|---|---|
| 2007/0275302 A1* | 11/2007 | Sotowa | ............... H01M 4/0433 429/217 |
| 2011/0159360 A1* | 6/2011 | Hirota | ................... H01M 4/624 429/206 |
| 2012/0295159 A1 | 11/2012 | Kobayashi | |
| 2012/0315541 A1 | 12/2012 | Sasaki et al. | |
| 2013/0089780 A1* | 4/2013 | Uezono | ................... H01M 4/04 429/211 |
| 2013/0119318 A1 | 5/2013 | Hanasaki et al. | |
| 2013/0323588 A1 | 12/2013 | Kajiwara et al. | |

FOREIGN PATENT DOCUMENTS

| | | |
|---|---|---|
| CN | 102439768 A | 5/2012 |
| JP | 2010-140684 A | 6/2010 |
| JP | 2011-108373 A | 6/2011 |
| JP | 2011-243464 A | 12/2011 |
| JP | 2012-209258 A | 10/2012 |
| WO | 2010/130976 A1 | 11/2010 |
| WO | 20111096463 A1 | 8/2011 |
| WO | 20111122297 A1 | 10/2011 |

OTHER PUBLICATIONS

The First Office Action issued by the Chinese Patent Office dated Aug. 3, 2016, which corresponds to Chinese Patent Application No. 201380058036.9 and is related to U.S. Appl. No. 14/440,583; with English language translation.
A translation of Written Opinion of the International Searching Authority; PCT/JP2013/080280.
International Search Report; PCT/JP2013/080280; dated Dec. 10, 2013.

\* cited by examiner

*Primary Examiner* — Stephan J Essex
(74) *Attorney, Agent, or Firm* — Studebaker & Brackett PC

(57) ABSTRACT

A slurry composition for a lithium ion secondary battery negative electrode including a negative electrode active material, a conductive material, a water-soluble polymer, and a particulate binder, wherein an amount of the conductive material with respect to 100 parts by weight of the negative electrode active material is 0.1 parts by weight to 10 parts by weight, the water-soluble polymer has a 1% aqueous solution viscosity of 10 mPa·s to 3,000 mPa·s, and the particulate binder contains a particulate binder A having a surface acid amount of 0.01 meq/g or more and 0.10 meq/g or less and a particulate binder B having a surface acid amount of 0.15 meq/g or more and 0.5 meq/g or less.

8 Claims, No Drawings

US 10,297,819 B2

SLURRY COMPOSITION FOR LITHIUM ION SECONDARY BATTERY NEGATIVE ELECTRODE, NEGATIVE ELECTRODE FOR LITHIUM ION SECONDARY BATTERY AND METHOD FOR PRODUCING THE SAME, AND LITHIUM ION SECONDARY BATTERY

FIELD

The present invention relates to a slurry composition for a lithium ion secondary battery negative electrode, a negative electrode for a lithium ion secondary battery and a method for producing the same, and a lithium ion secondary battery.

BACKGROUND

In recent years, portable electronic terminals such as a notebook-sized personal computer, a cellular phone, and a personal digital assistant (PDA) are remarkably spread. As a secondary battery used as a power source for these portable electronic terminals, for example, a lithium ion secondary battery is often used. The portable electronic terminals are required to have a comfortable portability, and therefore reductions in size, thickness, and weight, and an increase in performance are rapidly promoted. As a result, the portable electronic terminals are used in a variety of situations. Like the portable electronic terminals, the secondary battery is also required to reduce the size, thickness, and weight, and increase the performance.

For improving performance of the secondary battery, improvement of an electrode, an electrolytic solution, and other members of the battery is investigated. Of these, the negative electrode is usually produced by dispersing or dissolving a polymer used as a binder in a solvent to prepare a liquid composition, mixing a negative electrode active material with the liquid composition to obtain a slurry composition, applying the slurry composition onto a current collector, and then drying the applied slurry composition. It has hitherto been attempted to achieve a higher-performance secondary battery by selecting a binder suitable for the negative electrode produced by the aforementioned method.

For example, in Patent Literature 1, an attempt has been made to improve the cycle property of a lithium ion secondary battery by using, as a binder, two types of carboxy-modified styrene-butadiene copolymer latexes each having a different glass transition temperature.

CITATION LIST

Patent Literature

Patent Literature 1: Japanese Patent Application Laid-Open No. 2011-108373 A

SUMMARY

Technical Problem

However, the demands for the performance of lithium ion secondary batteries are recently at a very high level. Particularly, there is a need to improve the cycle property and low-temperature output property.

The present invention has been created in view of the aforementioned requirements, and it is an object to provide a slurry composition for a lithium ion secondary battery negative electrode and a negative electrode for a lithium ion secondary battery that give a lithium ion secondary battery having excellent cycle property and low-temperature output property, a method for producing a lithium ion secondary battery negative electrode that gives a lithium ion secondary battery having excellent cycle property and low-temperature output property, and a lithium ion secondary battery having excellent cycle property and low-temperature output property.

Solution to Problem

To solve the aforementioned problems, the present inventor has conducted extensive studies and found out that a lithium ion secondary battery having excellent cycle property and low-temperature output property can be realized by using a negative electrode slurry composition containing a negative electrode active material, a conductive material, a water-soluble polymer, and a particulate binder, wherein the amount of the conductive material falls within a specific range, the 1% aqueous solution viscosity of the water-soluble polymer falls within a specific range, and the particulate binder contains a combination of a particulate binder A with a relatively lower surface acid amount and a particulate binder B with a relatively higher surface acid amount. Thus the present invention has been completed.

Accordingly, the present invention is as follows.

(1) A slurry composition for a lithium ion secondary battery negative electrode, the slurry composition comprising a negative electrode active material, a conductive material, a water-soluble polymer, and a particulate binder, wherein an amount of the conductive material with respect to 100 parts by weight of the negative electrode active material is 0.1 parts by weight to 10 parts by weight, the water-soluble polymer has a 1% aqueous solution viscosity of 10 mPa·s to 3,000 mPa·s, and the particulate binder contains a particulate binder A having a surface acid amount of 0.01 meq/g or more and 0.10 meq/g or less and a particulate binder B having a surface acid amount of 0.15 meq/g or more and 0.5 meq/g or less.

(2) The slurry composition for a lithium ion secondary battery negative electrode according to (1), wherein the negative electrode active material is at least one selected from the group consisting of graphite and silicon-containing compounds.

(3) The slurry composition for a lithium ion secondary battery negative electrode according to (1) or (2), wherein the conductive material has a specific surface area of 50 $m^2/g$ to 1,500 $m^2/g$.

(4) The slurry composition for a lithium ion secondary battery negative electrode according to any one of (1) to (3), wherein the water-soluble polymer contains carboxymethyl cellulose.

(5) The slurry composition for a lithium ion secondary battery negative electrode according to any one of (1) to (4), wherein the particulate binder A contains 0.1% by weight to 10% by weight of an ethylenically unsaturated monocarboxylic acid monomer unit.

(6) The slurry composition for a lithium ion secondary battery negative electrode according to any one of (1) to (5), wherein the particulate binder B contains 1% by weight to 10% by weight of an ethylenically unsaturated dicarboxylic acid monomer unit.

(7) The slurry composition for a lithium ion secondary battery negative electrode according to any one of (1) to (6), wherein a weight ratio of the particulate binder A with respect to the particulate binder (particulate binder A)/(the particulate binder B) is 0.01 to 1.

(8) A lithium ion secondary battery negative electrode obtained by applying the slurry composition for a lithium ion secondary battery negative electrode according to any one of (1) to (7) onto a current collector and then drying the slurry composition, wherein the lithium ion secondary battery negative electrode has a penetration-type volume resistivity of $1\times10^{-5}$ Ω·cm to $1\times10^{+1}$ Ω·cm, and an amount of solid content on the current collector after the slurry composition for a lithium ion secondary battery negative electrode is applied onto the current collector and dried is 10 mg/cm² to 20 mg/cm².

(9) A lithium ion secondary battery comprising the lithium ion secondary battery negative electrode according to (8), a positive electrode, and an electrolytic solution.

(10) A method for producing a lithium ion secondary battery negative electrode, the method comprising applying the slurry composition for a lithium ion secondary battery negative electrode according to any one of (1) to (7) onto a current collector, and then drying the applied slurry composition.

Advantageous Effects of Invention

According to the present invention, a slurry composition for a lithium ion secondary battery negative electrode and a negative electrode for a lithium ion secondary battery that give a lithium ion secondary battery having excellent cycle property and low-temperature output property, a method for producing a lithium ion secondary battery negative electrode that gives a lithium ion secondary battery having excellent cycle property and low-temperature output property, and a lithium ion secondary battery having excellent cycle property and low-temperature output property can be realized.

DESCRIPTION OF EMBODIMENTS

The present invention will be described hereinbelow in detail with reference to embodiments and exemplifications. However, the present invention is not limited to the following embodiments and exemplifications. The present invention may be optionally modified without departing from the scope of claims and equivalents thereto.

In the present description, (meth)acrylic acid means acrylic acid or methacrylic acid. Further, (meth)acrylate means acrylate or methacrylate. Further, (meth)acrylonitrile means acrylonitrile or methacrylonitrile.

That a substance is "water-soluble" means that when 0.5 g of the substance is dissolved in 100 g of water at 25° C., the insoluble content is less than 0.5% by weight. On the other hand, that a substance is "water-insoluble" means that when 0.5 g of the substance is dissolved in 100 g of water at 25° C., the insoluble content is 90% by weight or more.

"meq" included in the unit for the surface acid amount means milliequivalent.

[1. Slurry Composition for Lithium Ion Secondary Battery Negative Electrode]

A slurry composition for a lithium ion secondary battery negative electrode according to the present invention (the slurry composition for a lithium ion secondary battery negative electrode may be appropriately referred to hereinbelow as a "negative electrode slurry composition") is a fluid composition containing a negative electrode active material, a conductive material, a water-soluble polymer, and a particulate binder. The negative electrode slurry composition of the present invention usually contains a solvent.

[1.1. Negative Electrode Active Material]

The negative electrode active material is an electrode active material for the negative electrode and is a material capable of transferring electrons in the negative electrode of the lithium ion secondary battery. As the negative electrode active material, a material that is capable of storing and releasing lithium is usually used.

Preferred examples of the negative electrode active material may include negative electrode active materials formed from carbon. Examples of the negative electrode active materials formed from carbon may include natural graphite, artificial graphite, and carbon black. Of these, graphite such as artificial graphite or natural graphite is preferable, and natural graphite is particularly preferable.

Other preferred examples of the negative electrode active material may include negative electrode active materials containing metals. Particularly, a negative electrode active material containing at least one selected from the group consisting of tin, silicon, germanium, and lead is preferable. A negative electrode active material containing any of the aforementioned elements can have a reduced irreversible capacity.

Among the negative electrode active materials containing any of these metals, a negative electrode active material containing silicon is preferable. The use of the negative electrode active material containing silicon enables enlargement of electric capacity of the lithium ion secondary battery. Generally, the negative electrode active material containing silicon expands and contracts to a large extent (for example, by a factor of about 5) during charging and discharging. However, with the negative electrode produced using the negative electrode slurry composition of the present invention, a reduction in the battery performance due to the expansion and contraction of the negative electrode active material containing silicon can be suppressed. In addition, since the diameter of particles of the negative electrode active material containing silicon is usually small, the particles generally tend to have poor dispersibility in a negative electrode slurry composition and in a negative electrode active material layer. However, small-diameter particles such as the particles of the negative electrode active material containing silicon can be well dispersed in the negative electrode slurry composition of the present invention.

Examples of the negative electrode active material containing silicon may include metallic silicon and silicon-containing compounds. A silicon-containing compound is a compound of silicon and another element, and examples thereof may include SiO, $SiO_2$, $SiO_x$ (0.01≤x<2), SiC, and SiOC. Among these silicon-containing compounds, $SiO_x$, SiOC, and SiC are preferable. From the viewpoint of battery life, $SiO_x$ and SiOC are more preferable, and $SiO_x$ is particularly preferable. $SiO_x$ is a compound that may be formed from metallic silicon and one or both of SiO and $SiO_2$. $SiO_x$ may be produced, for example, by heating a mixture of $SiO_2$ and metallic silicon to generate silicon monoxide gas and then cooling the silicon monoxide gas to effect precipitation.

It is preferable that, among the aforementioned negative electrode active materials, at least one negative electrode active material selected from graphite and silicon-containing compounds is used for obtaining well-balanced high capacity and life property of the lithium ion secondary battery. Graphite, $SiO_x$, SiOC, and SiC are more preferable, and graphite and $SiO_x$ are particularly preferable.

One type of these negative electrode active materials may be solely used, or two or more types thereof may be used in combination at any ratio. Therefore, two types or more of the negative electrode active materials from those described above may be used in combination. Particularly, a negative electrode active material containing a combination of a negative electrode active material containing silicon and a negative electrode active material formed from carbon is preferably used. It is presumed that, when the combination of the negative electrode active material containing silicon and the negative electrode active material formed from carbon is used as the negative electrode active material, Li is intercalated into and deintercalated from the negative electrode active material containing silicon at high electropotential and that Li is intercalated into and deintercalated from the negative electrode active material formed from carbon at low electropotential. Expansion and contraction are thereby suppressed, so that the cycle property of the lithium ion secondary battery can be improved.

When a combination of the negative electrode active material containing silicon and the negative electrode active material formed from carbon is used, the negative electrode active material used may be a composite of silicon and conductive carbon. By forming the composite of silicon and conductive carbon, swelling of the negative electrode active material itself can be suppressed. Examples of the method for forming the composite may include the following methods:

A method in which a negative electrode active material containing silicon is coated with conductive carbon to obtain a composite.

A method in which a mixture containing conductive carbon and a negative electrode active material containing silicon is granulated to obtain a composite.

When the negative electrode active material containing a combination of the negative electrode active material containing silicon and the negative electrode active material formed from carbon is used, the amount of silicon atoms with respect to 100 parts by weight of the total amount of carbon atoms in the negative electrode active material is preferably 0.1 parts by weight to 50 parts by weight. Thereby conductive paths are favorably formed, and the negative electrode can have high conductivity.

Preferably, the weight ratio of the negative electrode active material formed from carbon with respect to the negative electrode active material containing silicon ("the weight of the negative electrode active material formed from carbon"/"the weight of the negative electrode active material containing silicon") falls within a specific range. Specifically, the weight ratio is preferably 50/50 or higher, and more preferably 70/30 or higher and is preferably 97/3 or lower, and more preferably 90/10 or lower. Thereby cycle property of the secondary battery can be improved.

Preferably, the negative electrode active material is granulated into particles. When the particles of the negative electrode active material are spherical, a denser electrode can be formed upon forming the electrode. When the negative electrode active material is in the form of particles, the volume average particle diameter of the particles is appropriately selected in consideration of other structural requirements of the secondary battery. The specific value of the volume average particle diameter of the particles of the negative electrode active material is preferably 0.1 µm or more, more preferably 1 µm or more, and particularly preferably 5 µm or more, and is preferably 100 µm or less, more preferably 50 µm or less, and particularly preferably 30 µm or less. The volume average particle diameter is a particle diameter when a cumulative volume calculated from a small-diameter side in a particle size distribution measured by a laser diffraction method reaches 50%.

From the viewpoint of improving power density, the specific surface area of the negative electrode active material is usually 2 $m^2/g$ or more, preferably 3 $m^2/g$ or more, and more preferably 5 $m^2/g$ or more, and is usually 20 $m^2/g$ or less, preferably 15 $m^2/g$ or less, and more preferably 10 $m^2/g$ or less. The specific surface area of the negative electrode active material may be measured by, for example, a BET method.

The amount of the negative electrode active material is set such that the ratio of the negative electrode active material in a negative electrode active material layer is preferably 90% by weight or more, and more preferably 95% by weight or more, and is preferably 99.9% by weight or less, and more preferably 99% by weight or less. Thereby the capacity of the lithium ion secondary battery can be enlarged, and the flexibility of the negative electrode and the binding property between a current collector and the negative electrode active material layer can be improved.

[1.2. Conductive Material]

The conductive material is a component that can improve the degree of electrical contact between the particles of the negative electrode active material. In the negative electrode slurry composition of the present invention, the conductive material is dispersed in a favorable manner, and the favorable dispersibility can be maintained also in the negative electrode active material layer. Therefore, the conductive material can form a large number of conductive paths in the negative electrode active material layer, so that the resistance of the negative electrode can be reduced. The output property, such as the low-temperature output property, of the lithium ion secondary battery can thereby be improved. Further, the conductive material can usually improve the discharging rate property of the lithium ion secondary battery.

Examples of the conductive material may include conductive carbons such as furnace black, acetylene black, Ketjen black, oil furnace black, carbon black, graphite, vapor phase-grown carbon fibers, and carbon nanotubes. Of these, acetylene black, oil furnace black, and Ketjen black are preferable because the low-temperature output property and life property of the lithium ion secondary battery can be well balanced, and acetylene black and Ketjen black are particularly preferable. One type of these conductive materials may be solely used, or two or more types thereof may be used in combination at any ratio.

The specific surface area of the conductive material is preferably 50 $m^2/g$ or more, more preferably 60 $m^2/g$ or more, and particularly preferably 70 $m^2/g$ or more, and is preferably 1,500 $m^2/g$ or less, more preferably 1,200 $m^2/g$ or less, and particularly preferably 1,000 $m^2/g$ or less. When the specific surface area of the conductive material is equal to or more than the lower limit of the aforementioned range, low-temperature output property of the lithium ion secondary battery can be improved. When the specific surface area is equal to or less than the upper limit, binding property between the current collector and the negative electrode active material layer can be increased.

The amount of the conductive material with respect to 100 parts by weight of the negative electrode active material is usually 0.1 parts by weight or more, preferably 0.2 parts by weight or more, and more preferably 0.3 parts by weight or more, and is usually 10 parts by weight or less, preferably 8 parts by weight or less, and more preferably 5 parts by weight or less. When the amount of the conductive material is equal to or more than the lower limit of the aforementioned range, low-temperature output property of the lithium ion secondary battery can be improved. When the amount of the conductive material is equal to or less than the upper limit, binding property between the current collector and the negative electrode active material layer can be increased.

[1.3. Water-soluble Polymer]

The water-soluble polymer for use has a 1% aqueous solution viscosity of preferably 10 mPa·s or more, more preferably 20 mPa·s or more, and particularly preferably 50 mPa·s or more, and preferably 3,000 mPa·s or less, more preferably 2,500 mPa·s or less, and particularly preferably 2,000 mPa·s or less. The 1% aqueous solution viscosity of the water-soluble polymer means the viscosity of an aqueous solution containing the water-soluble polymer at a concentration of 1% by weight.

By using the water-soluble polymer having a 1% aqueous solution viscosity equal to or more than the lower limit of the aforementioned range, binding property of the negative electrode active material layer to the current collector can be improved. The reason why such an advantage can be obtained is not clear. However, according to studies by the present inventor, the reason may be as follows. Specifically, the water-soluble polymer having a 1% aqueous solution viscosity within the aforementioned range reduces the surface tension of the negative electrode slurry composition to thereby improve the wettability of the negative electrode slurry composition on the current collector. Therefore, when the negative electrode slurry composition is applied onto the current collector, the film of the negative electrode slurry composition can firmly adhere to the current collector. This may be the reason why the binding property between the current collector and the negative electrode active material layer obtained from the film of the negative electrode slurry composition can be increased.

By using the water-soluble polymer having a 1% aqueous solution viscosity equal to or less than the upper limit of the aforementioned range, dispersibility of particles of the negative electrode active material, the conductive material, etc. in the negative electrode slurry composition can also be increased. The reason why such an advantage can be obtained is not clear. However, according to studies by the present inventor, the reason may be as follows. Specifically, the water-soluble polymer having a 1% aqueous solution viscosity within the aforementioned range is dissolved in the solvent in the negative electrode slurry composition. In this case, part of the water-soluble polymer is in a free form in the solvent, but other part is adsorbed on the surface of the particles. The adsorbed water-soluble polymer forms a stable layer that coats the surface of the particles. This may be the reason why the dispersibility of the particles in water is improved.

Further, with the water-soluble polymer having a 1% aqueous solution viscosity within the aforementioned range, the following advantages can usually be obtained.

Specifically, a negative electrode slurry composition containing a conductive material generally has thixotropy. However, by using the water-soluble polymer having a 1% aqueous solution viscosity within the aforementioned range, the thixotropy can usually be reduced. Therefore, the applicability and handleability of the negative electrode slurry composition can be improved.

Generally, when a negative electrode slurry composition containing a conductive material is dried to form a negative electrode active material layer, the conductive material can easily migrate to the surface of the slurry composition because of convection generated in the slurry composition during drying, so that a larger amount of the conductive material tends to be present near the surface of the negative electrode active material layer. However, by using the water-soluble polymer having a 1% aqueous solution viscosity within the aforementioned range, migration of the conductive material during drying of the negative electrode slurry composition can usually be suppressed, and therefore the dispersibility of the conductive material in the negative electrode active material layer can be increased.

Examples of the water-soluble polymer may include water-soluble polysaccharides, sodium polyacrylate, polyethyleneimine, polyvinyl alcohol, and polyvinylpyrrolidone. Of these, water-soluble polysaccharides are preferable, and carboxymethyl cellulose is particularly preferable. Carboxymethyl cellulose may be used in the form of a salt such as a sodium salt or an ammonium salt. One type of these water-soluble polymers may be solely used, or two or more types thereof may be used in combination at any ratio.

The amount of the water-soluble polymer with respect to 100 parts by weight of the negative electrode active material is preferably 0.1 parts by weight or more, and more preferably 0.5 parts by weight or more, and is preferably 5 parts by weight or less, and more preferably 3 parts by weight or less. When the amount of the water-soluble polymer is equal to or more than the lower limit of the aforementioned range, dispersibility of the particles of the negative electrode active material, the conductive material, etc. in the negative electrode slurry composition can be increased. When the amount of the water-soluble polymer is equal to or lower than the upper limit, low-temperature output property of the lithium ion secondary battery can be improved.

[1.4. Particulate Binder]

The particulate binder is a particulate polymer and capable of causing bind between the particles of the negative electrode active material, between the particles of the negative electrode active material and the particles of the conductive material, and between the particles of the conductive material in the negative electrode active material layer. The particulate binder is also capable of causing bind between the negative electrode active material layer and the current collector in the negative electrode. In the negative electrode slurry composition of the present invention, the particulate binder contains a combination of a particulate binder A with a relatively lower surface acid amount and a particulate binder B with a relatively higher surface acid amount.

The use of the particulate binder A with a lower surface acid amount can increase the dispersibility of the conductive material to facilitate the formation of a conductive path network in the negative electrode active material layer. The reason why such an advantage can be obtained is not clear. However, according to studies by the present inventor, the reason may be as follows. Generally, when a negative electrode slurry composition containing a conductive material is dried to form a negative electrode active material layer, the conductive material can easily migrate to the surface of the slurry composition because of convection generated in the slurry composition during drying. Therefore, in the negative electrode active material layer containing the conductive material, the conductive material is present unevenly in a thickness direction, and conductive paths are less likely to be formed in some regions in the thickness direction. However, when the particulate binder A is used, the particulate binder A tends to coagulate together with the conductive material during drying of the negative electrode slurry composition, so that migration of the conductive material due to convection can be prevented. Therefore, favorable dispersibility of the conductive material in the negative electrode slurry composition is maintained also in the negative electrode active material layer after drying. Since the dispersibility of the conductive material in the negative electrode active material layer is favorable, conductive paths are easily formed over the entire region in the thickness direction of the negative electrode active material layer, and this may facilitate the formation of the conductive path network.

By using the particulate binder B with a higher surface acid amount, dispersion stability of the particles of the negative electrode active material, the conductive material, etc. can be increased in the negative electrode slurry composition. The reason why such an advantage can be obtained is not clear. However, according to studies by the present inventor, the reason may be as follows. As the particulate binder B has a high surface acid amount, it has high affinity to the negative electrode active material and to the conductive material. Therefore, the particulate binder B may easily enter spaces between the particles of the negative electrode active material, the conductive material, etc. and therefore may have the function of increasing the dispersibility of the negative electrode active material and the conductive material in the negative electrode slurry composition. The particulate binder B entering the spaces between the particles prevents coagulation of the particles, so that the dispersibility of the particles is maintained over the lapse of time. Therefore, the temporal change in the viscosity of the negative electrode slurry composition is suppressed, and this may be the reason for the increase of the dispersion stability.

The method for measuring the surface acid amounts of the particulate binders such as the particulate binder A and the particulate binder B is as follows.

An aqueous dispersion containing a particulate binder (solid content concentration: 2%) is prepared. The aqueous dispersion containing the particulate binder is placed in a 150 mL-glass vessel washed with distilled water such that the weight of the particulate binder is 50 g. The glass vessel is placed in a solution electric conductivity meter, and the aqueous dispersion is stirred. The stirring is thereafter continued until addition of hydrochloric acid is completed.

0.1N sodium hydroxide is added to the aqueous dispersion containing the particulate binder such that the electric conductivity of the aqueous dispersion containing the particulate binder becomes 2.5 mS to 3.0 mS. After a lapse of 6 minutes, the electric conductivity is measured. The measured value is taken as the electric conductivity at the onset of the measurement.

Then 0.5 mL of 0.1N hydrochloric acid is added to the resultant aqueous dispersion containing the particulate binder, and the electric conductivity is measured 30 seconds after the addition. Then 0.5 mL of 0.1N hydrochloric acid is again added, and the electric conductivity is measured 30 seconds after the addition. This operation is repeated at intervals of 30 seconds until the electric conductivity of the aqueous dispersion containing the particulate binder becomes equal to or higher than the electric conductivity at the onset of the measurement.

The obtained electric conductivity data is plotted on a graph with the electric conductivity (unit: "mS") on the vertical axis (the Y coordinate axis) and the cumulative amount of the hydrochloric acid added (unit: "millimole") on the horizontal axis (the X coordinate axis). A (hydrochloric acid amount)-(electric conductivity) curve having three inflection points is thereby obtained. The inflection point is a point at which the (hydrochloric acid amount)-(electric conductivity) curve is bent. The X coordinates of the three inflection points and the X coordinate when the addition of hydrochloric acid is completed are denoted, in ascending order, by P1, P2, P3, and P4. Approximate straight lines L1, L2, L3, and L4 are determined by the least square method for data in four sections, i.e., data in a section in which the X coordinate ranges from zero to the coordinate value P1, data in a section in which the X coordinate ranges from the coordinate value P1 to the coordinate vale P2, data in a section in which the X coordinate ranges from the coordinate value P2 to the coordinate value P3, and data in a section in which the X coordinate ranges from the coordinate value P3 to the coordinate value P4. The X coordinate of the intersection of the approximate straight line L1 and the approximate straight line L2 is denoted by A1 (millimoles), and the X coordinate of the intersection of the approximate straight line L2 and the approximate straight line L3 is denoted by A2 (millimoles). The X coordinate of the intersection of the approximate straight line L3 and the approximate straight line L4 is denoted by A3 (millimoles).

The surface acid amount per gram of the particulate binder and the acid amount in the aqueous phase per gram of the particulate binder are given as milliequivalents in terms of hydrochloric acid using the following formulae (a) and (b). The total acid amount per gram of the particulate binder dispersed in water is the sum of the formulae (a) and (b) as shown in the following formula (c).

Surface acid amount per gram of particulate binder= $(A2-A1)/$(weight of particulate binder) (a)

Acid amount in aqueous phase per gram of particulate binder=$(A3-A2)/$(weight of particulate binder) (b)

Total acid group amount per gram of particulate binder dispersed in water=$(A3-A1)/$(weight of particulate binder) (c)

The specific surface acid amount of the particulate binder A is usually 0.01 meq/g or more, preferably 0.02 meq/g or more, and more preferably 0.03 meq/g or more, and is usually 0.10 meq/g or less, preferably 0.095 meq/g or less, and more preferably 0.090 meq/g or less. When the surface acid amount of the particulate binder A is equal to or more than the lower limit of the aforementioned range, dispersibility of the conductive material in the negative electrode active material layer can be increased. When the surface acid amount of the particulate binder A is equal to or lower than the upper limit, life property of the lithium ion secondary battery, such as the cycle property, can be improved.

The aforementioned surface acid amount of the particulate binder A may be controlled, for example, by changing the type of the structural unit of the particulate binder A and the ratio thereof. Specifically, for example, it is preferable from the viewpoint of achieving the aforementioned surface acid amount of the particulate binder A that the particulate binder A is formed from a polymer containing an ethylenically unsaturated monocarboxylic acid monomer unit. The ethylenically unsaturated monocarboxylic acid monomer unit is a structural unit having a structure formed by polymerization of an ethylenically unsaturated monocarboxylic acid monomer. The ethylenically unsaturated monocarboxylic acid monomer unit has a carboxy group (a —COOH group). Further, the ethylenically unsaturated monocarboxylic acid monomer is hydrophilic. Therefore, when the particulate binder A is produced by emulsion polymerization using water as a reaction medium, a large amount of the ethylenically unsaturated monocarboxylic acid monomer unit usually gathers in the surface portion of the particulate binder A. Therefore, use of the ethylenically unsaturated monocarboxylic acid monomer unit allows the particulate binder A to have acids on its surface. Since the number of carboxy groups per structural unit of the ethylenically unsaturated monocarboxylic acid monomer unit is one, the surface acid amount of the particulate binder A can be made relatively small.

Since the carboxy groups have high polarity, the ethylenically unsaturated monocarboxylic acid monomer unit has a function of increasing binding property of the particulate binder A to the negative electrode active material, the conductive material, and the current collector. Since the ethylenically unsaturated monocarboxylic acid monomer unit is a structural unit with high strength, it can give high strength to the particulate binder A. Therefore, binding property of the negative electrode active material layer to the current collector can be increased.

Examples of the ethylenically unsaturated monocarboxylic acid monomer may include acrylic acid, methacrylic acid, and crotonic acid. Of these, acrylic acid and methacrylic acid are preferable. One type of these ethylenically unsaturated monocarboxylic acid monomers may be solely used, or two or more types thereof may be used in combination at any ratio.

The ratio of the ethylenically unsaturated monocarboxylic acid monomer unit in the particulate binder A is preferably 0.1% by weight or more, more preferably 0.2% by weight or more, and particularly preferably 0.3% by weight or more, and is 10% by weight or less, more preferably 8% by weight or less, and particularly preferably 5% by weight or less. When the ratio of the ethylenically unsaturated monocarboxylic acid monomer unit is equal to or more than the lower limit of the aforementioned range, dispersibility of the conductive material in the negative electrode active material layer can be increased. When the ratio of the ethylenically unsaturated monocarboxylic acid monomer unit is equal to or lower than the upper limit, life property of the lithium ion secondary battery can be improved. The ratio of the ethylenically unsaturated monocarboxylic acid monomer unit in the particulate binder A is usually identical to the ratio of the ethylenically unsaturated monocarboxylic acid monomer with respect to the total amount of monomers for the particulate binder A (charging ratio).

The particulate binder A may contain a structural unit other than the aforementioned ethylenically unsaturated monocarboxylic acid monomer unit.

For example, the particulate binder A may contain a (meth)acrylic acid ester monomer unit. The (meth)acrylic acid ester monomer unit is a structural unit having a structure formed by polymerization of a (meth)acrylic acid ester monomer.

Examples of the (meth)acrylic acid ester monomer may include alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these, alkyl acrylates are preferable, and ethyl acrylate, n-butyl acrylate, and 2-ethylhexyl acrylate are more preferable. One type of these (meth)acrylic acid ester monomers may be solely used, or two or more types thereof may be used in combination at any ratio.

In the particulate binder A, the ratio of the (meth)acrylic acid ester monomer unit is preferably 80% by weight or more, and more preferably 85% by weight or more, and is preferably 99% by weight or less, and more preferably 98% by weight or less. When the amount of the (meth)acrylic acid ester monomer unit is equal to or more than the lower limit of the aforementioned range, binding property of the negative electrode active material layer to the current collector can be increased. When the amount of the (meth)acrylic acid ester monomer unit is equal to or lower than the upper limit, flexibility of the negative electrode can be increased. The ratio of the (meth)acrylic acid ester monomer unit in the particulate binder A is usually identical to the ratio of the (meth)acrylic acid ester monomer with respect to the total amount of monomers for the particulate binder A (charging ratio).

The particulate binder A may further contain, for example, a nitrile group-containing monomer unit. The nitrile group-containing monomer unit represents a structural unit having a structure formed by polymerization of a nitrile group-containing monomer. The nitrile group-containing monomer unit has a nitrile group (—CN). This nitrile group interacts with polar groups on the surface of the current collector, the surface of the negative electrode active material, and the surface of the conductive material, and therefore the nitrile group-containing monomer unit can have high binding property. This enforces binding property of the negative electrode active material layer to the current collector.

Examples of the nitrile group-containing monomer may include unsaturated nitrile monomers. Of these, an α,β-ethylenically unsaturated nitrile monomer is preferable. The number of carbon atoms in the nitrile group-containing monomer is preferably 3 or more and 18 or less. Specific examples of the nitrile group-containing monomer may include acrylonitrile, methacrylonitrile, and α-chloroacrylonitrile. Of these, acrylonitrile is preferable. One type of these nitrile group-containing monomers may be solely used, or two or more types thereof may be used in combination at any ratio.

The ratio of the nitrile group-containing monomer unit in the particulate binder A is preferably 0.1% by weight or more, and more preferably 0.2% by weight or more, and is preferably 10% by weight or less, and more preferably 5% by weight or less. When the ratio of the nitrile group-containing monomer unit is equal to or more than the lower limit of the aforementioned range, binding property of the negative electrode active material layer to the current collector can be increased. When the ratio of the nitrile group-containing monomer unit is equal to or lower than the upper limit, resistance of the particulate binder A to an electrolytic solution can be increased. Therefore, excessive swelling of the particulate binder A with the electrolytic solution can be prevented, and a reduction in the binding property can thereby suppressed. The ratio of the nitrile group-containing monomer unit in the particulate binder A is usually identical to the ratio of the nitrile group-containing monomer with respect to the total amount of monomers for the particulate binder A (charging ratio).

Further, the particulate binder A may contain, for example, a crosslinkable monomer unit. The crosslinkable monomer unit is a structural unit having a structure formed by polymerization of a crosslinkable monomer. The crosslinkable monomer is a monomer that can form a crosslinked structure during or after polymerization by heating or irradiation with energy rays. When the particulate binder A contains a crosslinkable monomer unit, the particulate binder A can be crosslinked to increase stiffness. Therefore, even when the negative electrode active material is repeatedly expanded and contracted due to charging and discharging, swelling of the negative electrode can be suppressed. In addition, the degree of swelling of the particulate binder A with the electrolytic solution can be prevented from excessive increase.

Examples of the crosslinkable monomer may usually include thermally crosslinkable monomers. More specific examples of the crosslinkable monomer may include monofunctional monomers having a thermally crosslinkable group and having one olefinic double bond per molecule; and polyfunctional monomers having two or more olefinic double bonds per molecule.

Examples of the thermally crosslinkable group may include an epoxy group, an N-methylolamido group, an oxetanyl group, an oxazoline group, and combinations thereof. Of these, an epoxy group is more preferable from the viewpoint of the ease of crosslinking and control of crosslink density.

Examples of the crosslinkable monomer having an epoxy group as the thermally crosslinkable group and having an olefinic double bond may include unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexane, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of the crosslinkable monomer having an N-methylolamido group as the thermally crosslinkable group and having an olefinic double bond may include (meth)acrylamides having a methylol group such as N-methylol(meth)acrylamide.

Examples of the crosslinkable monomer having an oxetanyl group as the thermally crosslinkable group and having an olefinic double bond may include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Examples of the crosslinkable monomer having an oxazoline group as the thermally crosslinkable group and having an olefinic double bond may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the polyfunctional monomer having two or more olefinic double bonds may include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinyl ether, hydroquinone diallyl ether, tetraallyloxyethane, trimethylolpropane-diallyl ether, other allyl ethers and vinyl ethers of polyfunctional alcohols, triallylamine, methylenebisacrylamide, and divinylbenzene.

Particularly, the crosslinkable monomer is preferably a crosslinkable monomer having an epoxy group as the thermally crosslinkable group and having an olefinic double bond or a polyfunctional monomer having two or more olefinic double bonds. The crosslinkable monomer is particularly preferably allyl methacrylate, ethylene dimethacrylate, allyl glycidyl ether, or glycidyl methacrylate.

One type of these crosslinkable monomers and crosslinkable monomer units may be solely used, or two or more types thereof may be used in combination at any ratio.

The ratio of the crosslinkable monomer unit in the particulate binder A is preferably 0.1% by weight or more, and more preferably 0.2% by weight or more, and is preferably 2% by weight or less, and more preferably 1.5% by weight or less. When the ratio of the crosslinkable monomer unit falls within the aforementioned range, swelling of the particulate binder A with the electrolytic solution is suppressed, and swelling of the negative electrode can be suppressed. The ratio of the crosslinkable monomer unit in the particulate binder A is usually identical to the ratio of the crosslinkable monomer with respect to the total amount of monomers for the particulate binder A (charging ratio).

The particulate binder A may contain an optional structural unit other than the aforementioned structural units. Examples of the optional structural unit may include structural units having structures obtained by polymerizing the following monomers. One type of optional monomer may be solely used, or two or more types of optional monomers may be used in combination at any ratio.

Examples of the optional monomer may include styrene-based monomers such as styrene, chlorostyrene, vinyltoluene, t-butylstyrene, vinylbenzoic acid, methyl vinylbenzoate, vinylnaphthalene, chloromethylstyrene, hydroxymethylstyrene, α-methylstyrene, and divinylbenzene; sulfonic acid group-containing monomers such as vinylsulfonic acid, styrene sulfonic acid, allylsulfonic acid, sulfoethyl methacrylate, sulfopropyl methacrylate and sulfobutyl methacrylate, and alkali metal salts of these monomers; and a fluorine-containing (meth)acrylic acid ester monomer represented by the following formula (I).

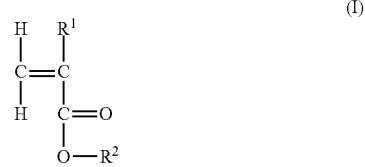

In the aforementioned formula (I), $R^1$ represents a hydrogen atom or a methyl group.

In the aforementioned formula (I), $R^2$ represents a hydrocarbon group containing a fluorine atom. The number of carbon atoms in the hydrocarbon group is usually 1 or more and is usually 18 or less. The number of fluorine atoms contained in $R^2$ may be 1 and may also be 2 or more.

The ratio of the optional structural unit in the particulate binder A is preferably 0% by weight to 30% by weight, and more preferably 0% by weight to 25% by weight. The ratio of the optional structural unit in the particulate binder A is usually identical to the ratio of the optional monomer with respect to the total amount of monomers for the particulate binder A (charging ratio).

The specific surface acid amount of the particulate binder B is usually 0.15 meq/g or more, preferably 0.22 meq/g or more, and more preferably 0.25 meq/g or more, and is usually 0.5 meq/g or less, preferably 0.45 meq/g or less, and more preferably 0.4 meq/g or less. When the surface acid amount of the particulate binder B is equal to or more than the lower limit of the aforementioned range, dispersibility of the negative electrode active material in the negative electrode slurry composition and in the negative electrode active material layer can be increased. When the surface acid amount of the particulate binder B is equal to or lower than the upper limit, life property of the lithium ion secondary battery can be improved.

The aforementioned surface acid amount of the particulate binder B may be controlled by, for example, changing the type of the structural unit of the particulate binder B and the ratio thereof. Specifically, for example, it is preferable from the viewpoint of achieving the aforementioned surface acid amount of the particulate binder B that the particulate binder B is formed from a polymer containing an ethylenically unsaturated dicarboxylic acid monomer unit. The ethylenically unsaturated dicarboxylic acid monomer unit is a structural unit having a structure formed by polymerization of an ethylenically unsaturated dicarboxylic acid monomer. The ethylenically unsaturated dicarboxylic acid monomer unit contains carboxy groups, as does the aforementioned ethylenically unsaturated monocarboxylic acid monomer unit. Generally, the ethylenically unsaturated dicarboxylic acid monomer is hydrophilic. Therefore, when the particulate binder B is produced by emulsion polymerization using water as a reaction medium, a large amount of the ethylenically unsaturated dicarboxylic acid monomer unit gathers in the surface portion of the particulate binder B. Therefore, use of the ethylenically unsaturated dicarboxylic acid monomer unit allows the particulate binder B to have acid on its surface. Since the number of carboxy groups per structural unit of the ethylenically unsaturated dicarboxylic acid monomer unit is two, the surface acid amount of the particulate binder B can be made relatively large.

Since the carboxy groups have a high polarity, the ethylenically unsaturated dicarboxylic acid monomer unit has a function of increasing binding property of the particulate binder B to the negative electrode active material, the conductive material, and the current collector. Since the ethylenically unsaturated dicarboxylic acid monomer unit is a structural unit with high strength, it can give high strength to the particulate binder B. Therefore, binding property of the negative electrode active material layer to the current collector can be increased. Further, polarity of the carboxy groups improves the affinity of the particulate binder B to a polar solvent, and the wettability of the particulate binder B with the electrolytic solution can thereby be improved.

Usually, when a highly hydrophilic monomer among the ethylenically unsaturated dicarboxylic acid monomers is used, the ethylenically unsaturated dicarboxylic acid monomer is easily copolymerized on the surface of the particulate binder B, and therefore the surface acid amount tends to be easily controlled. Preferred examples of the ethylenically unsaturated dicarboxylic acid monomer may include maleic acid, phthalic acid, and itaconic acid. Anhydrides of these acids may also be used. Of these, itaconic acid is preferable. Among the ethylenically unsaturated dicarboxylic acid monomers, itaconic acid has a slow reaction rate in a synthesis reaction of the particulate binder B. Therefore, when itaconic acid is used, a large amount of the structural unit formed by polymerization of itaconic acid gathers particularly on the surface of the particulate binder B. In this manner, the surface acid amount of the particulate binder B can be effectively increased. One type of these ethylenically unsaturated dicarboxylic acid monomers may be solely used, or two or more types thereof may be used in combination at any ratio.

The ratio of the ethylenically unsaturated dicarboxylic acid monomer unit in the particulate binder B is preferably 1% by weight or more, more preferably 2% by weight or more, and particularly preferably 3% by weight or more, and is preferably 10% by weight or less, more preferably 8% by weight or less, and particularly preferably 5% by weight or less. When the ratio of the ethylenically unsaturated dicarboxylic acid monomer unit is equal to or more than the lower limit of the aforementioned range, dispersibility of the negative electrode active material in the negative electrode slurry composition and the negative electrode active material layer can be increased. When the ratio of the ethylenically unsaturated dicarboxylic acid monomer unit is equal to or lower than the upper limit, life property of the lithium ion secondary battery can be improved. The ratio of the ethylenically unsaturated dicarboxylic acid monomer unit in the particulate binder B is usually identical to the ratio of the ethylenically unsaturated dicarboxylic acid monomer with respect to the total amount of monomers for the particulate binder B (charging ratio).

The particulate binder B may contain a structural unit other than the aforementioned ethylenically unsaturated dicarboxylic acid monomer unit.

For example, the particulate binder B may contain an aromatic vinyl monomer unit. The aromatic vinyl monomer unit is a structural unit having a structure formed by polymerization of an aromatic vinyl monomer. The aromatic vinyl monomer unit is a structural unit with high-stiffness. Therefore, when the aromatic vinyl monomer unit is contained, the stiffness of the particulate binder B can be increased. Therefore, rupture strength of the particulate binder B can be improved. Since the stiffness of the particulate binder B is high, even when, for example, a negative electrode active material containing silicon is repeatedly expanded and contracted due to charging and discharging, the particulate binder B can abut against the negative electrode active material such that the contact between the particulate binder B and the negative electrode active material is not lost. Therefore, the binding property of the negative electrode active material layer to the current collector can be increased. The effect of improving the binding property is significant particularly when charging and discharging are repeated. If the amount of the aromatic vinyl monomer unit is large, the stiffness of the particulate binder B becomes high, so that the negative electrode active material that has been displaced by stress due to expansion and contraction can be returned to the original position by strong force. Therefore, even when the negative electrode active material is repeatedly expanded and contracted, the negative electrode active material layer can resist swelling.

Examples of the aromatic vinyl monomer may include styrene, α-methylstyrene, vinyltoluene, and divinylbenzene. Of these, styrene is preferable. One type of these aromatic vinyl monomers may be solely used, or two or more types thereof may be used in combination at any ratio.

The ratio of the aromatic vinyl monomer unit in the particulate binder B is preferably 40% by weight or more, and more preferably 45% by weight or more, and is preferably 80% by weight or less, and more preferably 70% by weight or less. When the ratio of the aromatic vinyl monomer unit is equal to or more than the lower limit of the aforementioned range, binding property of the negative electrode active material layer to the current collector can be increased. In addition, even when the negative electrode active material is repeatedly expanded and contracted, the negative electrode active material layer can resist swelling. When the ratio of the aromatic vinyl monomer unit is equal to or lower than the upper limit, ratio of the ethylenically unsaturated dicarboxylic acid monomer unit contained in the particulate binder B can relatively be increased. Therefore, the amount of the carboxy groups contained in the particulate binder B can be increased, and this can increase the binding property of the negative electrode active material layer to the current collector. The ratio of the aromatic vinyl monomer unit in the particulate binder B is usually identical to the ratio of the aromatic vinyl monomer with respect to the total amount of monomers for the particulate binder B (charging ratio).

Further, the particulate binder B may contain, for example, an aliphatic diene monomer unit. The aliphatic diene monomer unit is a structural unit having a structure formed by polymerization of an aliphatic diene monomer. The aliphatic diene monomer unit is a flexible structural unit with low stiffness. Therefore, by forming the particulate binder B using a polymer containing the aliphatic diene monomer unit, the flexibility of the particulate binder B can be increased. Therefore, sufficient bonding property between the negative electrode active material layer and the current collector can be obtained.

Examples of the aliphatic diene monomer may include 1,3-butadiene, 2-methyl-1,3-butadiene, 2,3-dimethyl-1,3-butadiene, 2-chloro-1,3-butadiene, substituted straight chain conjugated pentadienes, and substituted side-chain conjugated hexadienes. Of these, 1,3-butadiene and 2-methyl-1,3-butadiene are preferable, and 1,3-butadiene is particularly preferable. One type of these aliphatic diene monomers may be solely used, or two or more types thereof may be used in combination at any ratio.

The ratio of the aliphatic diene monomer unit in the particulate binder B is preferably 10% by weight or more, and more preferably 15% by weight or more, and is preferably 50% by weight or less, and more preferably 45% by weight or less. When the ratio of the aliphatic diene monomer unit is equal to or more than the lower limit of the aforementioned range, flexibility of the negative electrode can be increased. When the ratio of the aliphatic diene monomer unit is equal to or less than the upper limit, binding property between the current collector and the negative electrode active material layer can be improved. The ratio of the aliphatic diene monomer unit in the particulate binder B is usually identical to the ratio of the aliphatic diene monomer with respect to the total amount of monomers for the particulate binder B (charging ratio).

Further, the particulate binder B may contain, for example, a hydroxyl group-containing monomer unit. The hydroxyl group-containing monomer unit is a structural unit having a structure formed by polymerization of a hydroxyl group-containing monomer. The hydroxyl group (—OH group) in the hydroxyl group-containing monomer unit has high polarity and has a function of increasing binding property of the particulate binder B to the negative electrode active material and the current collector. Therefore, when the hydroxyl group-containing monomer unit is contained, binding property of the negative electrode active material layer to the current collector can be further increased. The polarity of the hydroxyl group can increase affinity of the particulate binder B to water. Therefore, with the hydroxyl group-containing monomer unit, the particulate binder B can be further stably dispersed in water, so that stability of the negative electrode slurry composition can be improved. Further, by using a combination of the hydroxyl group-containing monomer unit and the ethylenically unsaturated dicarboxylic acid monomer, copolymerizability of the ethylenically unsaturated dicarboxylic acid monomer can be increased, so that the surface acid amount can be controlled more easily. The polarity of the hydroxyl group improves affinity of the particulate binder B to a polar solvent, so that the wettability of the particulate binder B with the electrolytic solution can be improved.

Examples of the hydroxyl group-containing monomer may include hydroxyalkyl acrylates such as 2-hydroxyethyl acrylate, 2-hydroxyethyl methacrylate, 2-hydroxypropyl acrylate, 2-hydroxypropyl methacrylate, hydroxybutyl acrylate, hydroxybutyl methacrylate, 3-chloro-2-hydroxypropyl methacrylate, di-(ethylene glycol)maleate, di-(ethylene glycol)itaconate, 2-hydroxyethyl maleate, bis(2-hydroxyethyl) maleate, and 2-hydroxyethylmethyl fumarate; allyl alcohol; and monoallyl ethers of polyhydric alcohols. Of these, hydroxyalkyl acrylates are preferable, and 2-hydroxyethyl acrylate is particularly preferable. One type of these hydroxyl group-containing monomers may be solely used, or two or more types thereof may be used in combination at any ratio.

The ratio of the hydroxyl group-containing monomer unit in the particulate binder B is preferably 0.1% by weight or more, and more preferably 0.2% by weight or more, and is preferably 5% by weight or less, and more preferably 3% by weight or less. When the ratio of the hydroxyl group-containing monomer unit is equal to or more than the lower limit of the aforementioned range, wettability of the particulate binder B with the electrolytic solution can be improved. When the ratio of the hydroxyl group-containing monomer unit is equal to or less than the upper limit, stability of the particulate binder B during production and its wettability with the electrolytic solution can be simultaneously achieved. The ratio of the hydroxyl group-containing monomer unit in the particulate binder B is usually identical to the ratio of the hydroxyl group-containing monomer with respect to the total amount of monomers for the particulate binder B (charging ratio).

The particulate binder B may contain an optional structural unit other than the aforementioned structural units. Examples of the optional structural unit may include structural units having structures obtained by polymerizing the following monomers. One type of optional monomer may be solely used, or two or more types of optional monomers may be used in combination at any ratio.

Examples of the optional monomer may include styrene-based monomers such as styrene, chlorostyrene, vinyltoluene, t-butylstyrene, vinylbenzoic acid, methyl vinylbenzoate, vinylnaphthalene, chloromethylstyrene, hydroxymethylstyrene, α-methylstyrene, and divinylbenzene; sulfonic acid group-containing monomers such as vinylsulfonic acid, styrene sulfonic acid, allylsulfonic acid, sulfoethyl methacrylate, sulfopropyl methacrylate and sulfobutyl methacrylate, and alkali metal salts of these monomers; and a fluorine-containing (meth)acrylic acid ester monomer represented by the aforementioned formula (I).

The ratio of the optional structural unit in the particulate binder B is preferably 0% by weight to 30% by weight and more preferably 0% by weight to 25% by weight. The ratio of the optional structural unit in the particulate binder B is usually identical to the ratio of the optional monomer with respect to the total amount of monomers for the particulate binder B (charging ratio).

The weight ratio of the particulate binder A with respect to the particulate binder B (the particulate binder A/the particulate binder B) is preferably 0.01 or more, more preferably 0.02 or more, and particularly preferably 0.05 or more, and is preferably 1 or less, more preferably 0.95 or less, and particularly preferably 0.9 or less. When the weight ratio of the particulate binder A with respect to the particulate binder B is equal to or more than the lower limit of the aforementioned range, dispersibility of the conductive material in the negative electrode active material layer can be effectively increased. When the weight ratio is equal to or less than the upper limit, binding property between the current collector and the negative electrode active material layer can be increased.

The glass transition temperature of the particulate binder containing the particulate binders A and B is preferably −75° C. or higher, more preferably −55° C. or higher, and particularly preferably −35° C. or higher, and is preferably 20° C. or lower, and more preferably 15° C. or lower. When the glass transition temperature of the particulate binder falls within the aforementioned range, properties such as binding property between the negative electrode active material and the particulate binder, flexibility and windability of the negative electrode, and binding property between the negative electrode active material layer and the current collector are highly balanced, which is preferable.

The particulate binder is in a particle form in the negative electrode slurry composition and is usually contained in the negative electrode while keeping the particle shape. The number average particle diameter of the particulate binder is preferably 50 nm or more, and more preferably 70 nm or more, and is preferably 500 nm or less, and more preferably 400 nm or less. When the number average particle diameter of the particulate binder falls within the aforementioned range, negative electrode to be obtained can have high strength and high flexibility.

The number average particle diameter is obtained by measuring the diameters of 100 particles of the particulate binder randomly selected in a transmission electron microscope photograph and then calculating the arithmetic average of the measured diameters. The particles may be spherical or may have irregular shapes.

The amount of the particulate binder containing the particulate binders A and B with respect to 100 parts by weight of the negative electrode active material is preferably 0.1 parts by weight or more, and more preferably 0.5 parts by weight or more, and is preferably 10 parts by weight or less, and more preferably 5 parts by weight or less. When the amount of the particulate binder is equal to or more than the lower limit of the aforementioned range, binding property between the negative electrode active material layer and the current collector can be improved. When the amount of the particulate binder is equal to or lower than the upper limit, low-temperature output property of the lithium ion secondary battery can be improved.

As the method for producing the aforementioned particulate binders A and B, any method may be employed so long as a particulate binder having a desired surface acid amount can be obtained. Examples of the method for producing the particulate binders A and B may include a method including polymerizing a monomer composition containing the aforementioned monomers for the particulate binder A or B in an aqueous solvent to obtain the particulate binder A or B as polymer particles.

The ratio of the monomers in the monomer composition is usually the same as the ratio of the structural units in the particulate binder A or B.

No particular limitation is imposed on the aqueous solvent, so long as it can disperse the particulate binder A or B. Usually, the aqueous solvent is selected from aqueous solvents having a boiling point at normal pressure of usually 80° C. or higher, and preferably 100° C. or higher, and is usually 350° C. or lower, and preferably 300° C. or lower. Examples of the aqueous solvents are as follows. In the following exemplification, numbers in parentheses following the name of the solvent indicate a boiling point (unit: ° C.) at normal pressure, and the value is rounded off or down to the nearest whole number.

Examples of the aqueous solvent may include water (100); ketones such as diacetone alcohol (169) and γ-butyrolactone (204); alcohols such as ethyl alcohol (78), isopropyl alcohol (82), and normal propyl alcohol (97); glycol ethers such as propylene glycol monomethyl ether (120), methyl cellosolve (124), ethyl cellosolve (136), ethylene glycol tertiary butyl ether (152), butyl cellosolve (171), 3-methoxy-3-methyl-1-butanol (174), ethylene glycol monopropyl ether (150), diethylene glycol monobutyl ether (230), triethylene glycol monobutyl ether (271), and dipropylene glycol monomethyl ether (188); and ethers such as 1,3-dioxolane (75), 1,4-dioxolane (101), and tetrahydrofuran (66). Of these, water is particularly preferable from the viewpoint that it is not flammable and a dispersion of the particulate binder A or B can be easily obtained. Alternatively, water may be used as a main solvent, and any of the aforementioned aqueous solvents other than water may be mixed with water within the range in which the dispersed state of the particulate binder A or B can be maintained.

No particular limitation is imposed on the method for polymerization. For example, any of a solution polymerization method, a suspension polymerization method, a bulk polymerization method, an emulsion polymerization method, etc. may be used. The polymerization method for use may be any process such as ion polymerization, radical polymerization, or living radical polymerization. Of these, the emulsion polymerization method is particularly preferable from the viewpoint of production efficiency. With the emulsion polymerization method, a high-molecular weight product can be easily obtained. In addition, since the binder is obtained in the form of particle dispersion in water with the emulsion polymerization method, no re-dispersion treatment is required, so that the product may be used as it is for the production of the negative electrode slurry composition.

Usually, the emulsion polymerization method is performed in accordance with a conventional procedure. For example, the emulsion polymerization method may be performed using a method described in "Jikken Kagaku Koza (Course of Experimental Chemistry)" Vol. 28 (published by Maruzen Company, Limited, edited by The Chemical Society of Japan). Specifically, the method described in this literature is a method including adding water, additives such as a dispersant, an emulsifier, and a crosslinking agent, a polymerization initiator, and monomers at a specific compositional ratio to a closed vessel equipped with a stirrer and a heater; stirring the composition in the vessel to emulsify the monomers etc. in water; and elevating temperature under stirring to initiate polymerization. Alternatively, in this method, after the aforementioned composition is emulsified, the emulsion is placed in a closed vessel, and the reaction is initiated in a similar manner.

Examples of the polymerization initiator may include organic peroxides such as lauroyl peroxide, diisopropyl peroxydicarbonate, di-2-ethylhexyl peroxydicarbonate, t-butyl peroxypivalate, and 3,3,5-trimethylhexanoyl peroxide; azo compounds such as α,α'-azobisisobutyronitrile; ammonium persulfate; and potassium persulfate. One type of these polymerization initiators may be solely used, or two or more types thereof may be used in combination at any ratio.

The emulsifier, the dispersant, the polymerization initiator, etc. are generally used in these polymerization methods, and their amounts are usually set to amounts generally used in these methods. The polymerization is usually performed in one stage. However, the polymerization may be performed in two or more stages, as in, for example, seed polymerization that uses seed particles.

The temperature of the polymerization and the time of the polymerization may be optionally selected in accordance with the polymerization method, the type of the polymerization initiator, etc. Usually, the polymerization temperature is about 30° C. or higher, and the polymerization time is about 0.5 hours to about 30 hours.

An additive such as amine may be used as a polymerization aid.

The aqueous dispersion of the particulate binder A or B obtained by any of the aforementioned methods may be mixed with a basic aqueous solution containing, for example, a hydroxide of an alkali metal, ammonia, an inorganic ammonium compound, or an organic amine compound to adjust the pH of the aqueous dispersion within the range of usually 5 to 10 and preferably 5 to 9. Examples of the alkali metal may include Li, Na, K, Rb, and Cs. Examples of the inorganic ammonium compound may include $NH_4Cl$. Examples of the organic amine compound may include ethanolamine and diethylamine. Of these, an alkali metal hydroxide is preferably used for adjusting pH because binding property between the current collector and the negative electrode active material layer can be improved.

[1.5. Solvent]

The negative electrode slurry composition usually contains a solvent. As the solvent, water is usually used. In the negative electrode slurry composition, the solvent may disperse the negative electrode active material and the particulate binder and may dissolve the water-soluble polymer.

As the solvent, a combination of water and a solvent other than water may also be used. For example, it is preferable to use a combination of water and a liquid capable of dissolving the particulate binder and the water-soluble polymer. This is because, since thereby adsorption of the particulate binder and the water-soluble polymer onto the surface of the negative electrode active material is effected, and the dispersion of the negative electrode active material is further stabilized.

Preferably, the type of the liquid used in combination with water is selected from the viewpoint of drying rate and the environmental aspect. Preferred examples of the liquid may include cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; alcohols such as methanol, ethanol, isopropanol, ethylene glycol, and ethylene glycol monomethyl ether; and amides such as N-methylpyrrolidone and N,N-dimethylformamide. Of these, N-methylpyrrolidone (NMP) is preferable. One type of these solvents may be solely used, or two or more types thereof may be used in combination at any ratio.

Preferably, the amount of the solvent is adjusted such that the negative electrode slurry composition has a viscosity suitable for application. Specifically, the amount of the solvent used is adjusted such that the concentration of solid content in the negative electrode slurry composition is preferably 40% by weight or more, and more preferably 45% by weight or more, and is preferably 70% by weight or less, and more preferably 65% by weight or less. The solid content in the composition is the component that is not vaporized but remains after the composition is dried to remove liquid.

[1.6. Optional Components]

The negative electrode slurry composition may contain an optional component other than the negative electrode active material, the conductive material, the water-soluble polymer, the particulate binder, and the solvent described above. Examples of the optional component may include a reinforcing material, a leveling agent, nanoparticles, and an electrolyte additive. One type of these components may be solely used, or two or more types thereof may be used in combination at any ratio.

The reinforcing material used may be any of a variety of fillers. The filler may be any of an inorganic filler and an organic filler and may be any of spherical, plate-shaped, rod-shaped, and fiber-like fillers. One type of these reinforcing materials may be solely used, or two or more types thereof may be used in combination at any ratio. With the use of the reinforcing material, a stiff and flexible negative electrode can be obtained, and a lithium ion secondary battery having excellent cycle property can thereby be achieved.

The amount of the reinforcing material with respect to 100 parts by weight of the negative electrode active material is usually 0.01 parts by weight or more, and preferably 1 part by weight or more, and is usually 20 parts by weight or less, and preferably 10 parts by weight or less. When the amount of the reinforcing material falls within the aforementioned range, lithium ion secondary battery can have a high capacity and high load property.

Examples of the leveling agent may include surfactants such as alkyl-based surfactants, silicone-based surfactants, fluorine-based surfactants, and metal-based surfactants. One type of these leveling agents may be solely used, or two or more types thereof may be used in combination at any ratio. By using the leveling agent, repellence that occurs during application of the negative electrode slurry composition can be prevented, and smoothness of the negative electrode can be improved.

The amount of the leveling agent with respect to 100 parts by weight of the negative electrode active material is preferably 0.01 parts by weight to 10 parts by weight. When the amount of the leveling agent falls within the aforementioned range, a highly smooth negative electrode can be produced at high productivity, and excellent battery property can be obtained. When the surfactant is contained, dispersibility of the particles of the negative electrode active material etc. in the negative electrode slurry composition can be improved, and smoothness of the resulting negative electrode can thereby be improved.

Examples of the nanoparticles may include fumed silica particles and fumed alumina particles. One type of these nanoparticles may be solely used, or two or more types thereof may be used in combination at any ratio. When the nanoparticles are contained, thixotropy of the negative electrode slurry composition can be controlled, so that the leveling property of the negative electrode obtained can be improved.

The amount of the nanoparticles with respect to 100 parts by weight of the negative electrode active material is preferably 0.01 parts by weight to 10 parts by weight. When the nanoparticles are within the aforementioned range, stability and productivity of the negative electrode slurry composition can be improved, and high battery property can be achieved.

Examples of the electrolyte additive may include vinylene carbonate. One type of electrolyte additives may be solely used, or two or more types of electrolyte additives may be used in combination at any ratio. By using the electrolyte additive, for example, decomposition of the electrolytic solution can be suppressed.

The amount of the electrolyte additive with respect to 100 parts by weight of the negative electrode active material is preferably 0.01 parts by weight to 10 parts by weight. When the amount of the electrolyte additive falls within the aforementioned range, a secondary battery excellent in cycle property and high-temperature property can be achieved.

[1.7. Physical Properties of Negative Electrode Slurry Composition]

The negative electrode slurry composition is a fluid composition in which dispersion of the particles of the negative electrode active material, the conductive material, the particulate binder, etc. is achieved in a favorable manner. The dispersibility of the particles in the negative electrode slurry composition is not susceptible to changing because of the function of the particulate binder B. Therefore, the negative electrode slurry composition has high dispersion stability, so that, for example, the degree of change in viscosity of the negative electrode slurry composition before and after long-term storage thereof can be reduced.

The viscosity of the negative electrode slurry composition is preferably 2,000 mPa·s or more, and more preferably 3,000 mPa·s or more, and is preferably 10,000 mPa·s or less, and more preferably 5,000 mPa·s or less. When the viscosity of the negative electrode slurry composition falls within the aforementioned range, applicability and temporal stability of the negative electrode slurry composition can be improved. The aforementioned viscosity is a value measured using a B-type viscometer at 25° C. and a rotation speed of 60 rpm.

[1.8. Method for Producing Negative Electrode Slurry Composition]

The negative electrode slurry composition may be produced by mixing the negative electrode active material, the conductive material, the water-soluble polymer, the particulate binder, the solvent that is used if necessary, and optional components. As the specific procedure, any procedure may be used. Examples thereof may include the following methods:

A method including mixing the negative electrode active material, the conductive material, the water-soluble polymer, and the particulate binder simultaneously into a solvent.

A method including dissolving the water-soluble polymer in a solvent, then mixing therewith the particulate binder that has been dispersed in a solvent, and mixing therewith the negative electrode active material and the conductive material.

A method including mixing the negative electrode active material and conductive material with the particulate binder that has been dispersed in a solvent and then mixing with the resulting mixture the water-soluble polymer that has been dissolved in a solvent.

As the apparatus for mixing, any apparatus that can uniformly mix the aforementioned components may be used. Examples of such an apparatus may include a bead mill, a ball mill, a roll mill, a sand mill, a pigment disperser, a grinder, an ultrasonic disperser, a homogenizer, a planetary mixer, and Filmix. Of these, use of a ball mill, a roll mill, a pigment disperser, a grinder, and a planetary mixer is particularly preferable because dispersion at a high concentration can therewith be performed.

[2. Lithium Ion Secondary Battery Negative Electrode]

Using the aforementioned negative electrode slurry composition of the present invention, a negative electrode may be produced. This negative electrode includes a current collector and a negative electrode active material layer formed on the current collector. The negative electrode active material layer contains the negative electrode active material, the conductive material, the water-soluble polymer, and the particulate binder that are contained in the negative electrode slurry composition.

Examples of the method for producing the negative electrode using the negative electrode slurry composition may include a production method including applying the negative electrode slurry composition onto the current collector and drying the applied negative electrode slurry composition. This production method will be described in the following.

As the current collector, a member which is formed of a material having electric conductivity and electrochemical durability is used. The material of the current collector is preferably a metal material because it has heat resistance. Examples of the metal material may include iron, copper, aluminum, nickel, stainless steel, titanium, tantalum, gold, and platinum. Of these, copper is preferable for the current collector for the negative electrode. One type of these materials may be solely used, or two or more types thereof may be used in combination at any ratio.

No particular limitation is imposed on the shape of the current collector, and a sheet-shaped current collector having a thickness of about 0.001 mm to about 0.5 mm is preferable.

Preferably, the current collector is subjected to roughening treatment before the negative electrode active material layer is formed thereon, for improving the bonding strength with the negative electrode active material layer. When an intermediate layer is present between the current collector and the negative electrode active material layer, it is preferable to subject the current collector to roughening treatment before the intermediate layer is formed on the current collector. Examples of the method for the roughening treatment may include a mechanical polishing method, an electropolishing method, and a chemical polishing method. In the mechanical polishing method, for example, abrasive cloth or paper with abrasive particles adhering thereto, a grindstone, an emery wheel, a wire brush provided with steel wires, etc. is used.

The intermediate layer may be formed on the surface of the current collector, for increasing bonding strength between the current collector and the negative electrode active material layer and for increasing electroconductivity.

When the negative electrode slurry composition is applied onto the current collector, the negative electrode slurry composition may be applied onto only one side of the current collector or may be applied both sides. No particular limitation is imposed on the method for applying the negative electrode slurry composition onto the surface of the current collector. Examples of the application method may include a doctor blade method, a dipping method, a reverse roll method, a direct roll method, a gravure method, an extrusion method, and a brush coating method.

By applying the negative electrode slurry composition onto the surface of the current collector, a film of the negative electrode slurry composition is formed. The film of the negative electrode slurry composition is dried for removing liquid such as the solvent, and a negative electrode active material layer is thereby formed on the surface of the current collector.

Examples of the method for drying may include drying methods such as warm air drying, hot air drying, and low-moisture air drying; vacuum drying; and drying by irradiation with energy rays such as infrared rays, far-infrared rays, or an electron beam. The drying time is usually 1 minute to 30 minutes, and the drying temperature is usually 40° C. to 180° C.

It is preferable that, after the negative electrode slurry composition is applied onto the surface of the current collector and then dried, the negative electrode active material layer is subjected to a pressure treatment using a press such as a die press or a roll press as needed. The pressure treatment can reduce the porosity of the negative electrode active material layer. The porosity is preferably 5% or more, and more preferably 7% or more, and is preferably 30% or less, and more preferably 20% or less. When the porosity is equal to or more than the lower limit of the aforementioned range, a high volume capacity can be easily obtained, and the resulting negative electrode active material layer becomes less prone to be removed off the current collector. When the porosity is equal to or lower than the upper limit, high charging efficiency and high discharging efficiency can be obtained.

When the negative electrode active material layer contains a polymer that can be cured by a curing reaction such as a crosslinking reaction, the polymer may be cured at a suitable timing after the negative electrode slurry composition is applied onto the current collector. For example, when a negative electrode mixture layer contains a thermally crosslinkable polymer, heat treatment may be performed at 120° C. or higher for 1 hour or longer.

By the aforementioned method, a lithium ion secondary battery negative electrode including the current collector and the negative electrode active material layer formed on the current collector may be obtained. The negative electrode active material layer contains the negative electrode active material, the conductive material, the water-soluble polymer, and the particulate binder that are contained in the negative electrode slurry composition while their favorable dispersibility in the negative electrode slurry composition is maintained. Therefore, these components are highly dispersed in the negative electrode active material layer formed.

Generally, even when the dispersibility of the conductive material is favorable in a conventional negative electrode slurry composition, the distribution of the conductive material in a negative electrode active material layer produced using this negative electrode slurry composition tends to become non-uniform in the thickness direction. In view of this problem in the prior art, the fact that the high dispersibility of the conductive material in the negative electrode slurry composition of the present invention can be maintained also in the negative electrode active material layer is advantageous from the viewpoint of improving the performance of the negative electrode and of the productivity of the negative electrode.

Since the dispersibility of the conductive material in the negative electrode active material layer is favorable in this manner, the following advantages are usually obtained.

Since not only the negative electrode active material but also the conductive material have favorable dispersibility, an increase in particle diameter due to coagulation is unlikely to occur, so that void spaces between the particles of the negative electrode active material, the conductive material, etc. in the negative electrode active material layer can be reduced. This lead to enlargement of the binding areas of these particles bound to the current collector, and in turn improvement in binding property between the negative electrode active material layer and the current collector. Therefore, for example, the force required to peel the negative electrode active material layer off the current collector (peel strength) in the pre-press negative electrode coated with the negative electrode slurry composition can be increased.

Further, since the dispersibility of the conductive material in the negative electrode active material layer is favorable, the conductive material is distributed uniformly in the negative electrode active material layer. Therefore, in the negative electrode active material layer, a network of the conductive material is formed uniformly over the entire layer. This network forms conductive paths for electron transfer to the negative electrode active material. The favorable dispersibility of the conductive material allows the network of many conductive paths to be formed over the entire negative electrode active material layer, so that the resistance of the negative electrode can be reduced.

The network of the conductive material formed in this manner functions so as to suppress the swelling of the negative electrode active material layer caused by the expansion and contraction of the negative electrode active material. Specifically, when a conventional negative electrode active material is expanded and contracted during charging and discharging, the expansion and contraction tend to cause an increase in the distances between the particles of the negative electrode active material. However, the network of the mutually connected particles of the conductive material functions so as to prevent the positions of the particles of the negative electrode active material from changing due to expansion and contraction, so that the increase in the distances between the particles of the negative electrode active material due to expansion and contraction is suppressed. Therefore, swelling of the negative electrode active material layer caused by the increase in the distances between the particles of the negative electrode active material can be suppressed.

In the negative electrode obtained, the binding force between the current collector and the negative electrode active material layer is augmented. The reason why such a strong binding force can be obtained is not clear. However, this may be because each component in the negative electrode active material layer has high dispersibility and the binding force of the particulate binder to the negative electrode active material and to the current collector is augmented. Specifically, since each component in the negative electrode active material layer has high dispersibility, large secondary particles composed of a plurality of coagulated particles are unlikely to be formed, so that large void spaces are unlikely to be formed in the negative electrode active material layer. Therefore, the binding area of the negative electrode active material layer bound to the current collector is unlikely to be reduced by the void spaces, and the negative electrode active material layer has a large area bound to the current collector. This may be the reason why the binding property between the negative electrode active material layer and the current collector is augmented. Since the particulate binder has acid groups on its surface, the binding force of the particulate binder to the negative electrode active material and the current collector is augmented. This may also be the reason why the binding property between the negative electrode active material layer and the current collector can be augmented.

In the resulting negative electrode, the amount of the negative electrode active material layer per unit area of the surface of the current collector is preferably 10 mg/cm² or more, more preferably 12 mg/cm² or more, and particularly preferably 14 mg/cm² or more, and is preferably 20 mg/cm² or less, more preferably 18 mg/cm² or less, and particularly preferably 16 mg/cm² or less. When the amount of the negative electrode active material layer per unit area of the surface of the current collector is equal to or more than the lower limit of the aforementioned range, capacity of the lithium ion secondary battery can be increased. When the amount is equal to or lower than the upper limit, lithium ion secondary battery can have favorable life property. The amount of the negative electrode active material layer is usually identical to the amount of solid content in the negative electrode slurry composition applied onto the surface of the current collector. Therefore, it is preferable that the amount of the negative electrode slurry composition applied is controlled such that, after the negative electrode slurry composition is applied onto the current collector and dried, the amount of the solid content per unit area of the current collector falls within the aforementioned range.

From the viewpoint of setting the amount of the negative electrode active material layer per unit area to fall within the aforementioned range, the thickness of the negative electrode active material layer is usually 1 μm or more, preferably 5 μm or more, and more preferably 30 μm or more, and is usually 300 μm or less, preferably 250 μm or less, more preferably 200 μm or less, and particularly preferably 100 μm or less.

In the negative electrode of the present invention, the conductive material can be dispersed over the entire negative electrode active material layer in its thickness direction, as described above. Therefore, the conductive material can form conductive paths in the thickness direction of the negative electrode active material layer, and the resistance of the negative electrode active material layer in the thickness direction can thereby be effectively reduced. Specifically, the penetration-type volume resistivity of the negative electrode of the present invention is preferably $1 \times 10^{+1}$ Ω·cm or less, more preferably 5 Ω·cm or less, and particularly preferably 1 Ω·cm or less. When the penetration-type volume resistivity is at such a small level, the lithium ion secondary battery can have favorable life property. No particular limitation is imposed on the lower limit. However, from the viewpoint of increasing the capacity of the lithium ion secondary battery, the penetration-type volume resistivity is preferably $1 \times 10^{-5}$ Ω·cm or more.

[3. Lithium Ion Secondary Battery]

The lithium ion secondary battery of the present invention includes the aforementioned lithium ion secondary battery negative electrode, a positive electrode, and an electrolytic solution and usually further includes a separator. This lithium ion secondary battery is excellent in cycle property and therefore has a long service life. The reason why such excellent cycle property can be obtained is not clear. However, according to studies by the present inventor, the reason may be as follows.

In the negative electrode of the present invention, the conductive material has improved dispersibility as described above, so that the swelling of the negative electrode active material layer due to charging and discharging can be suppressed. In the negative electrode of the present invention, the binding property between the current collector and the negative electrode active material layer is augmented. Therefore, breakage of the conductive paths caused by the swelling of the negative electrode active material layer and by separation of the negative electrode active material layer from the current collector is unlikely to occur. Therefore, an increase in resistance due to charging and discharging can be suppressed, and this may be the reason why the cycle property can be improved.

The lithium ion secondary battery of the present invention is excellent in output property and particularly in low-temperature output property. The reason why such excellent output property can be obtained is not clear. However, according to studies by the present inventor, the reason may be as follows.

In the negative electrode active material layer, each of the components dispersed therein has high dispersibility. Particularly, the action of the particulate binder A promotes dispersion of the conductive material over the entire negative electrode active material layer, so that favorable conductive paths are formed. Therefore, electron conductivity in the negative electrode active material layer can be increased. Further, the function of the particulate binder B also promotes wettability of the negative electrode active material layer with the electrolytic solution, so that lithium ion conductivity in the negative electrode active material layer can be increased. Therefore, both the electron conductivity and the lithium ion conductivity can be increased to bring them into balance, and this may be the reason why the low-temperature output property can be improved.

[3.1. Positive Electrode]

The positive electrode usually includes a current collector and a positive electrode active material layer formed on the surface of the current collector. The positive electrode active material layer contains the positive electrode active material and a binder for the positive electrode.

As the current collector of the positive electrode, a member formed of a material having electric conductivity and electrochemical durability may be used. The current collector of the positive electrode may be the same as the current collector used for the negative electrode. Aluminum is particularly preferable.

A material that can be intercalated and deintercalated with lithium ions is used as the positive electrode active material. Such positive electrode active materials are broadly classified into inorganic compounds and organic compounds.

Examples of the positive electrode active material formed from an inorganic compound may include transition metal oxides, transition metal sulfides, lithium-containing complex metal oxides formed from lithium and transition metals.

Examples of the transition metal may include Ti, V, Cr, Mn, Fe, Co, Ni, Cu, and Mo.

Examples of the transition metal oxides may include MnO, $MnO_2$, $V_2O_5$, $V_6O_{13}$, $TiO_2$, $Cu_2V_2O_3$, amorphous $V_2O-P_2O_5$, $MoO_3$, $V_2O_5$, and $V_6O_{13}$. Of these, MnO, $V_2O_5$, $V_6O_{13}$, and $TiO_2$ are preferable in terms of cycle stability and capacity.

Examples of the transition metal sulfides may include $TiS_2$, $TiS_3$, amorphous $MoS_2$, and FeS.

Examples of the lithium-containing complex metal oxides may include lithium-containing complex metal oxides having a layer structure, lithium-containing complex metal oxides having a spinel structure, and lithium-containing complex metal oxides having an olivine-type structure.

Examples of the lithium-containing complex metal oxides having a layer structure may include lithium-containing cobalt oxide ($LiCoO_2$), lithium-containing nickel oxide ($LiNiO_2$), Co—Ni—Mn lithium complex oxide, Ni—Mn—Al lithium complex oxide, and Ni—Co—Al lithium complex oxide.

Examples of the lithium-containing complex metal oxides having a spinel structure may include lithium manganate ($LiMn_2O_4$) and $Li[Mn_{3/2}M_{1/2}]O_4$ obtained by substituting part of Mn with another transition metal (where M is Cr, Fe, Co, Ni, Cu, etc.).

Examples of the lithium-containing complex metal oxides having an olivine-type structure may include olivine-type lithium phosphate compounds represented by $Li_xMPO_4$ (where M is at least one selected from the group consisting of Mn, Fe, Co, Ni, Cu, Mg, Zn, V, Ca, Sr, Ba, Ti, Al, Si, B, and Mo, and X is a number satisfying $0 \leq X \leq 2$).

Examples of the positive electrode active material formed from an organic compound may include conductive polymer compounds such as polyacetylene and poly-p-phenylene.

A positive electrode active material formed of a composite material including a combination of an inorganic compound and an organic compound may also be used.

For example, an iron-based oxide may be subjected to reduction firing in the presence of a carbon source material to produce a composite material coated with the carbon material, and this composite material may be used as the positive electrode active material. The iron-based oxide tends to have low electric conductivity. However, such a composite material can be used as a high-performance positive electrode active material.

Further, a compound obtained by subjecting any of the aforementioned compounds to partial elemental substitution may also be used as the positive electrode active material.

A mixture of any of the aforementioned inorganic compounds and any of the aforementioned organic compounds may also be used as the positive electrode active material.

One type of these positive electrode active materials may be solely used, or two or more types thereof may be used in combination at any ratio.

The volume average particle diameter of the particles of the positive electrode active material is preferably 1 μm or more, and more preferably 2 μm or more, and is preferably 50 μm or less, and more preferably 30 μm or less. When the volume average particle diameter of the particles of the positive electrode active material falls within the aforementioned range, the amount of the binder used when the positive electrode active material layer is prepared can be reduced, and a reduction in the capacity of the lithium ion secondary battery can be suppressed. For forming the positive electrode active material layer, a positive electrode slurry composition containing the positive electrode active material and the binder is usually prepared. When the volume average particle diameter of the particles of the positive electrode active material falls within the aforementioned range, viscosity of the positive electrode slurry can be easily adjusted to a viscosity suitable for application, and a uniform positive electrode can thereby be obtained.

The ratio of the positive electrode active material in the positive electrode active material layer is preferably 90% by weight or more, and more preferably 95% by weight or more, and is preferably 99.9% by weight or less, and more preferably 99% by weight or less. When the content of the positive electrode active material falls within the aforementioned range, capacity of the lithium ion secondary battery can be increased, and flexibility of the positive electrode and binding property between the current collector and the positive electrode active material layer can be improved.

Examples of the binder for the positive electrode may include resins such as polyethylene, polytetrafluoroethylene (PTFE), polyvinylidene fluoride (PVDF), a tetrafluoroethylene-hexafluoropropylene copolymer (FEP), polyacrylic acid derivatives, and polyacrylonitrile derivatives; and soft polymers such as acrylic-based soft polymers, diene-based soft polymers, olefin-based soft polymers, and vinyl-based soft polymers. One type of these binders may be solely used, or two or more types thereof may be used in combination at any ratio.

If necessary, the positive electrode active material layer may contain a component other than the positive electrode active material and the binder. Examples of such a component may include a conductive material, a reinforcing material, a leveling agent, an antioxidant, and a thickener. One type of these components may be solely used, or two or more types thereof may be used in combination at any ratio.

The thickness of the positive electrode active material layer is usually 5 μm or more, and preferably 10 μm or more, and is usually 300 μm or less, and preferably 250 μm or less. When the thickness of the positive electrode active material layer falls within the aforementioned range, both high load property and high energy density can be achieved.

The positive electrode may be produced by, for example, dissolving or dispersing components to be contained in the positive electrode active material layer in a solvent to prepare a positive electrode slurry composition, applying the positive electrode slurry composition onto the current collector, and drying the applied positive electrode slurry composition.

[3.2. Electrolytic Solution]

As the electrolytic solution, a solution which includes a solvent and a supporting electrolyte dissolved in the solvent may be used.

A lithium salt is usually used as the electrolyte. Examples of the lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. In particular, $LiPF_6$, $LiClO_4$, and $CF_3SO_3Li$, which are highly soluble in a solvent and show a high dissociation degree, are suitably used. One type of these examples may be solely used, or two or more types thereof may be used in combination at any ratio. In general, since a supporting electrolyte showing a higher dissociation degree provides a higher lithium ion conductivity, the lithium ion conductivity can be adjusted by selecting the type of the supporting electrode.

The concentration of the supporting electrolyte in the electrolytic solution is usually 1% by weight or more, and preferably 5% by weight or more, and is usually 30% by weight or less, and preferably 20% by weight or less. When the amount of the supporting electrolyte falls within this range, ion conductivity can be raised, and the charging property and discharging property of the lithium ion secondary battery can be made favorable.

As the solvent for the electrolytic solution, those that can dissolve the supporting electrolyte may be used. Examples of the solvent used may include alkyl carbonates such as dimethyl carbonate (DMC), ethylene carbonate (EC), diethyl carbonate (DEC), propylene carbonate (PC), butylene carbonate (BC), and methylethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Dimethyl carbonate, ethylene carbonate, propylene carbonate, diethyl carbonate, and methylethyl carbonate are preferable since particularly high ion conductivity is easily obtained and a temperature range for use is wide. One type of the solvent may be solely used, or two or more types thereof may be used in combination at any ratio. Since a solvent with lower viscosity can provide a higher lithium ion conductivity, the lithium ion conductivity can be adjusted by selecting the type of the solvent.

If necessary, the electrolytic solution may further contain an additive. As the additive, a carbonate compound such as vinylene carbonate (VC) is preferable. One type of the additive may be solely used, or two or more types thereof may be used in combination at any ratio.

In place of the aforementioned electrolytic solutions, for example, gelled polymeric electrolyte in which a polymeric electrolyte such as polyethylene oxide and polyacrylonitrile is impregnated with an electrolytic solution; and an inorganic solid electrolyte such as lithium sulfide, LiI, and $Li_3N$ may be used.

[3.3. Separator]

As the separator, a porous substrate having a pore portion is usually used. Examples of the separator may include (a) a porous separator having a pore portion, (b) a porous separator having a polymer coating layer formed on one or both sides, and (c) a porous separator having a porous resin coating layer containing inorganic ceramic powders. Examples thereof may include polypropylene-based, polyethylene-based, polyolefinic, and aramid-based porous separators, polymer films for a solid polymer electrolyte or a gelled polymer electrolyte that are made of polyvinylidene fluoride, polyethylene oxide, polyacrylonitrile, or a polyvinylidene fluoride hexafluoropropylene copolymer; a separator coated with a gelled polymer coating layer; and a separator coated with a porous membrane layer formed of an inorganic filler and a dispersant for the inorganic filler.

[3.4. Method for Producing Lithium Ion Secondary Battery]

The method for producing the lithium ion secondary battery is not particularly limited. For example, the positive electrode and the negative electrode may be stacked with the separator interposed therebetween, and the resulting article may be wound or folded in conformity with the shape of the battery, and then put in a battery container. Subsequently, the electrolytic solution may be poured into the battery container, and the container may be sealed. If necessary, for example, expanded metal; an over-current protection element such as fuse and a PTC element; a lead board; or the like may be put to prevent an increase in the pressure inside the battery and overcharging and overdischarging. The shape of the battery may be any of a laminated cell shape, a coin shape, a button shape, a sheet shape, a cylindrical shape, a rectangular shape, and a flat shape.

EXAMPLES

The present invention will be specifically described hereinbelow with reference to Examples. However, the present invention is not limited to the following Examples. The present invention may be implemented with any modification without departing from the scope of claims and equivalents thereto.

Unless otherwise stated, "%" and "part(s)" that represent an amount in the following description are based on weight. Unless otherwise stated, operations in the following description were performed under conditions of normal temperature and normal pressure.

[Evaluation Methods]

(1) Method for Measuring Temporal Change Rate in Viscosity of Slurry

For each of the negative electrode slurry compositions produced in Examples and Comparative Examples, their viscosity $\eta 0$ was measured using a B-type viscometer at 60 rpm. Then the negative electrode slurry composition was stored at room temperature for 3 days, and the viscosity $\eta 1$ after storage was measured at 60 rpm. The temporal change rate in the viscosity of the slurry $\Delta\eta$ (%) was calculated with $\Delta\eta = \eta 1/\eta 0 \times 100$. The viscosity measurement temperature of the negative electrode slurry composition was 25° C. Smaller value of $\Delta\eta$ is indicative of higher dispersion stability of the negative electrode slurry composition.

(2) Method for Measuring Peel Strength of Pre-Press Negative Electrode and Pressed Negative Electrode Out of the pre-press negative electrode and the pressed electrode produced in each of the Examples and Comparative Examples, rectangular shape having a length of 100 mm and a width of 10 mm was cut, to produce test pieces. One of the test pieces was held with the surface of the negative electrode active material layer facing down, and the surface of the electrode active material layer was attached to a cellophane tape. The cellophane tape used was the one specified in JIS Z1522. The cellophane tape was secured to a horizontal test table in advance with the adhesive surface facing up. Then one end of the current collector was pulled vertically upward at a pulling rate of 50 mm/min to peel the current collector, and stress at this time was measured. This measurement was repeated three times, and the average of the measured stress values was determined and taken as the peel strength. Larger value of the peel strength $P_B$ of the pre-press negative electrode is indicative of higher dispersibility of each component in the negative electrode active material layer. Larger value of the peel strength $P_A$ of the pressed negative electrode is indicative of larger binding force, i.e., adhesion strength, of the negative electrode active material layer to the current collector.

(3) Method for Evaluating Cycle Property

Each of the laminated-type cell lithium ion secondary batteries produced in the Examples and Comparative Examples was left to stand in an environment of 25° C. for 24 hours. Then a charging-discharging operation including charging at a constant current of 1 C to 4.2 V and discharging to 3.0 V was performed in an environment of 25° C. to measure an initial capacity C0. Then charging and discharging were repeated in an environment of 60° C. under the same charging-discharging condition as those described above, and a capacity C2 after 1,000 cycles was measured. High-temperature cycle property was evaluated using a capacity retention rate $\Delta C$ (%) represented by $\Delta C = C2/C0 \times 100$. Larger value of the capacity retention rate $\Delta C$ is indicative of higher cycle property, and higher life property.

(4) Method for Evaluating Low-Temperature Output Property

Each of the laminated-type cell lithium ion secondary batteries produced in the Examples and Comparative Examples was left to stand in an environment of 25° C. for 24 hours. Then, a charging operation at a constant current of 0.1 C for 5 hours was performed in an environment of 25° C. to measure the voltage V0 after charging. After that, a discharging operation at a discharging rate of 1 C was performed in an environment of −10° C. Fifteen seconds after initiation of discharging, the voltage V1 was measured. The low-temperature output property was evaluated using voltage variation $\Delta V$ represented by $\Delta V = V0 - V1$. Lower value of the voltage variation $\Delta V$ is indicative of higher low-temperature output property.

(5) Method for Measuring Swelling Rate of Negative Electrode

For each of the laminated-type cell lithium ion secondary batteries produced in the Examples and Comparative Examples, the thickness of the negative electrode was measured at 10 points using a thickness meter before the battery was assembled, and the average d0 (μm) of the measured values was calculated. The assembled lithium ion secondary battery was left to stand in an environment of 25° C. for 24 hours. Then a charging-discharging operation including charging to 4.2 V and discharging to 3.0 V at a constant current of 1 C was performed in an environment of 25° C. Then a charging-discharging cycle was repeated 1,000 times on the lithium ion secondary battery in an environment of 60° C. under the same charging-discharging conditions as those described above. Then the cell of the lithium ion secondary battery was disassembled, and the thickness of the negative electrode was measured at 10 points using the thickness meter, and the average d1 (μm) of the measured values was calculated. The swelling rate Δd(%)=(d1−d0)/d0×100 (%) of the negative electrode was calculated. Smaller value of the swelling rate Δd is indicative of higher the dispersibility of the conductive material in the negative electrode active material layer, and higher life property of the lithium ion secondary battery.

(6) Method for Measuring Surface Acid Amount of Each of Particulate Binders A and B The solid content concentration of an aqueous dispersion containing the particulate binder (i.e., the particulate binder A or the particulate binder B) used as a sample was adjusted to 2%. The aqueous dispersion containing the particulate binder with the solid content concentration adjusted as described above was placed in a 150 mL-glass vessel washed with distilled water such that the amount of the particulate binder was 50 g. The glass vessel was placed in a solution electric conductivity meter ("CM-117" manufactured by Kyoto Electronics Manufacturing Co., Ltd., type of the cell used: K-121), and the aqueous dispersion was stirred. The stirring was thereafter continued until addition of hydrochloric acid was completed.

0.1N sodium hydroxide (manufactured by Wako Pure Chemical Industries, Ltd., Special Grade) was added to the aqueous dispersion containing the particulate binder such that the electric conductivity of the aqueous dispersion containing the particulate binder became 2.5 mS to 3.0 mS. After a lapse of 6 minutes, the electric conductivity was measured. The measured value was taken as the electric conductivity at the onset of the measurement.

Then 0.5 mL of 0.1N hydrochloric acid (manufactured by Wako Pure Chemical Industries, Ltd., Special Grade) was further added to the resultant aqueous dispersion containing the particulate binder, and the electric conductivity was measured 30 seconds after the addition. Then 0.5 mL of 0.1N hydrochloric acid was again added, and the electric conductivity was measured 30 seconds after the addition. This operation was repeated at intervals of 30 seconds until the electric conductivity of the aqueous dispersion containing the particulate binder became equal to or higher than the electric conductivity at the onset of the measurement.

The obtained electric conductivity data was plotted on a graph with the electric conductivity (unit: "mS") on the vertical axis (the Y coordinate axis) and the cumulative amount of the hydrochloric acid added (unit: "millimole") on the horizontal axis (the X coordinate axis). A (hydrochloric acid amount)–(electric conductivity) curve having three inflection points was thereby obtained. The inflection point is a point at which the (hydrochloric acid amount)–(electric conductivity) curve is bent. The X coordinates of the three inflection points and the X coordinate when the addition of hydrochloric acid was completed were denoted, in ascending order, by P1, P2, P3, and P4. Approximate straight lines L1, L2, L3, and L4 were determined using the least square method for data in four sections, i.e., data in a section in which the X coordinate ranged from zero to the coordinate value P1, data in a section in which the X coordinate ranged from the coordinate value P1 to the coordinate value P2, data in a section in which the X coordinate ranged from the coordinate value P2 to the coordinate value P3, and data in a section in which the X coordinate ranged from the coordinate value P3 to the coordinate value P4. The X coordinate of the intersection of the approximate straight line L1 and the approximate straight line L2 was denoted by A1 (millimoles), and the X coordinate of the intersection of the approximate straight line L2 and the approximate straight line L3 was denoted by A2 (millimoles). The X coordinate of the intersection of the approximate straight line L3 and the approximate straight line L4 was denoted by A3 (millimoles).

The surface acid amount per gram of the particulate binder and the acid amount in the aqueous phase per gram of the particulate binder are given as milliequivalents in terms of hydrochloric acid using the following formulae (a) and (b). The acid group amount per gram of the particulate binder dispersed in water is the sum of the formulae (a) and (b) as shown in the following formula (c).

$$\text{Surface acid amount per gram of particulate binder} = (A2-A1)/(\text{weight of particulate binder}) \quad (a)$$

$$\text{Acid amount in aqueous phase per gram of particulate binder} = (A3-A2)/(\text{weight of particulate binder}) \quad (b)$$

$$\text{Total acid group amount per gram of particulate binder dispersed in water} = (A3-A1)/(\text{weight of particulate binder}) \quad (c)$$

(7) Method for Measuring Penetration-Type Volume Resistivity of Negative Electrode A test piece having a diameter of 12 mm was stamped out of each of the lithium ion secondary battery negative electrodes produced in the Examples and Comparative Examples. The thickness d (w) and the area S of the negative electrode active material layer of the stamped test piece were measured. The test piece was clipped on a load cell of a universal testing machine ("SV-301NA" manufactured by Imada Seisakusho Co., Ltd.) and pressurized at a pressure of 20 MPa. A two-terminal clip was connected to the load cell, and a measurement cable was connected to a cyclic voltammetry measurement device ("HSV-110" manufactured by Hokuto Denko Corporation). A chronopotentiometry mode was used to apply a constant current I=10 mA to the load cell for 10 minutes, and the voltage V (V) at this time was measured. Resistance R(Ω)=V/I was calculated using the Ohm's law, and volume resistivity ρ(Ω·cm)=R×S/d was calculated to determine penetration-type volume resistivity ρ. Smaller value of the volume resistivity ρ is indicative of higher dispersibility of the conductive material.

Example 1

(1-1. Method for Producing Particulate Binder A)

A 5 MPa pressure-resistant container equipped with a stirrer was charged with 95 parts of butyl acrylate as the (meth)acrylic acid ester monomer, 2 parts of acrylonitrile as the nitrile group-containing monomer, 1 part of allyl methacrylate as the crosslinkable monomer, 2 parts of methacrylic acid as the ethylenically unsaturated monocarboxylic acid monomer, 0.4 parts of sodium dodecylbenzene sulfonate as an emulsifier, 150 parts of ion exchanged water, and 0.5 parts of potassium persulfate as the polymerization initiator. The mixture was sufficiently stirred and then heated to 50° C. to initiate polymerization. When the polymerization conversion ratio reached 96%, the mixture was cooled to terminate the reaction, whereby a mixture containing a particulate binder A was obtained. A 5% aqueous sodium hydroxide solution was added to the mixture containing the particulate binder A to adjust the pH to 8. Then unreacted monomers were removed by distillation under heating and reduced pressure. Then the resultant mixture was cooled to 30° C. or lower to thereby obtain an aqueous dispersion containing the desired particulate binder A. With this aqueous dispersion, surface acid amount of the particulate binder A was measured in accordance with the aforementioned method. The number average particle diameter of the particulate binder A was 250 nm, and its glass transition temperature was −30° C.

(1-2. Production of Particulate Binder B)

A 5 MPa pressure-resistant container equipped with a stirrer was charged with 33 parts of 1,3-butadiene as the aliphatic diene monomer, 3.5 parts of itaconic acid as the ethylenically unsaturated dicarboxylic acid monomer, 62.5 parts of styrene as the aromatic vinyl monomer, 1 part of 2-hydroxyethyl acrylate as the hydroxyl group-containing monomer, 0.4 parts of sodium dodecylbenzene sulfonate as an emulsifier, 150 parts of ion exchanged water, and 0.5 parts of potassium persulfate as the polymerization initiator. The mixture was sufficiently stirred and then heated to 50° C. to initiate polymerization. When the polymerization conversion ratio reached 96%, the mixture was cooled to terminate the reaction, whereby a mixture containing a particulate binder B was obtained. A 5% aqueous sodium hydroxide solution was added to the mixture containing the particulate binder B to adjust the pH to 8. Then unreacted monomers were removed by distillation under heating and reduced pressure. Then the resultant mixture was cooled to 30° C. or lower to thereby obtain an aqueous dispersion containing the desired particulate binder B. With this aqueous dispersion, surface acid amount of the particulate binder B was measured in accordance with the aforementioned method. The number average particle diameter of the particulate binder B was 150 nm, and its glass transition temperature was 10° C.

(1-3. Production of Negative Electrode Slurry Composition)

A planetary mixer equipped with a disper was charged with 100 parts of artificial graphite (volume average particle diameter: 24.5 μm) having a specific surface area of 5.5 m²/g as the negative electrode active material, 2 parts of acetylene black ("HS-100" manufactured by Denki Kagaku Kogyo Kabushiki Kaisha) having a specific surface area of 75 m²/g as the conductive material, and 1 part based on solid content of a 2% aqueous solution of carboxymethyl cellulose ("MAC-200HC" manufactured by Nippon Paper Chemicals Co., Ltd., viscosity of 1 wt % aqueous solution: 1,880 m Pa·s) as the water-soluble polymer. Then the concentration of solid content was adjusted to 60% with ion exchanged water. Then mixing was performed at 25° C. for 60 hours. Subsequently, the concentration of the solid content was adjusted to 55% with ion exchanged water. Then mixing was further performed at 25° C. for 15 minutes to obtain a mixed solution.

To the resulting mixed solution, 0.4 Parts based on the amount of the particulate binder A of the aqueous dispersion containing the particulate binder A obtained in the aforementioned step (1-1) and 1.6 parts based on the amount the particulate binder of the aqueous dispersion containing the particulate binder B obtained in the aforementioned step (1-2) were added. Then ion exchanged water was added such that the final solid content concentration was adjusted to 53%, and mixing was performed for 10 minutes. The mixture was subjected to defoaming treatment under reduced pressure to thereby obtain a negative electrode slurry composition having high fluidity. The temporal change rate in the slurry viscosity Δη of this negative electrode slurry composition was measured in accordance with the aforementioned method.

(1-4. Production of Negative Electrode)

The negative electrode slurry composition obtained in the aforementioned step (1-3) was applied onto a 20 μm-thick copper foil as a current collector using a comma coater, and then dried. In this case, the amount of the negative electrode slurry composition applied was set such that the amount of the solid content on the current collector after the negative electrode slurry composition applied was dried was 16 mg/cm². The drying was performed by conveying the copper foil through a 60° C. oven at a rate of 0.5 m/min over 2 minutes. Then heat treatment was performed at 120° C. for 2 minutes to thereby obtain a pre-press negative electrode. Test pieces were cut out from the pre-press negative electrode, and the peel strength of the pre-press negative electrode was measured.

The pre-press negative electrode was rolled using a roll press to obtain a pressed negative electrode having an 80 μm-thick negative electrode active material layer. Test pieces were cut out from the pressed negative electrode, and the peel strength and penetration-type volume resistivity of the pressed negative electrode were measured.

(1-5. Production of Positive Electrode Slurry Composition)

100 Parts of LiCoO₂ having a volume average particle diameter of 12 μm as the positive electrode active material, 2 parts of acetylene black ("HS-100" manufactured by Denki Kagaku Kogyo Kabushiki Kaisha) as the conductive material, and 2 parts based on solid content of polyvinylidene fluoride ("#7208" manufactured by Kureha Corporation) as the binder were mixed. Then N-methylpyrrolidone was further added to adjust the total solid content concentration to 70%. Then mixing was performed using a planetary mixer to thereby prepare a positive electrode slurry composition.

(1-6. Production of Positive Electrode)

The positive electrode slurry composition obtained in the aforementioned step (1-5) was applied onto a 20 μm-thick aluminum foil as a current collector using a comma coater such that the thickness after drying was about 150 μm, and then dried. The drying was performed by conveying the aluminum foil through a 60° C. oven at a rate of 0.5 m/min over 2 minutes. Then heat treatment was performed at 120° C. for 2 minutes to thereby obtain a pre-press positive electrode. The pre-press positive electrode was rolled using a roll press to obtain a pressed positive electrode having a 70 μm-thick positive electrode active material layer.

(1-7. Preparation of Separator)

Out of a polypropylene-made single-layer separator ("Celgard 2500" manufactured by Celgard), a square shape of 5×5 cm² was cut to prepare a separator.

(1-8. Lithium Ion Secondary Battery)

An aluminum exterior package was prepared as a battery exterior. Out of the positive electrode obtained in the aforementioned step (1-6), a square shape of 4×4 cm² was cut and disposed such that its surface on the current collector side was in contact with the aluminum exterior package. The square separator obtained in the aforementioned step (1-7) was placed on the surface of the positive electrode active material layer of the positive electrode. Then, out of the pressed negative electrode obtained in the aforementioned step (1-4), a square shape of 4.2×4.2 cm² was cut, and disposed on the separator such that the surface on the negative electrode active material layer side faced the separator. An electrolytic solution (solvent: volume ratio of ethylene carbonate/diethyl carbonate/vinylene carbonate=68.5/30/1.5, electrolyte: LiPF$_6$ with a concentration of 1 M) was poured into the aluminum package such that no air remained. To seal the opening of the aluminum package, heat sealing was performed at 150° C. to close the aluminum exterior package, whereby a lithium ion secondary battery was produced. The cycle property and low-temperature output property of the obtained lithium ion secondary battery and the swelling rate of the negative electrode were measured in accordance with the aforementioned methods.

Example 2

A lithium ion secondary battery was produced and evaluated in the same manner as in Example 1 except that the amount of acetylene black with respect to 100 parts of the negative electrode active material was changed to 0.15 parts in the aforementioned step (1-3), and that the amount of ion exchanged water was adjusted such that the final solid content concentration in the negative electrode slurry composition became 54% in the aforementioned step (1-3).

Example 3

A lithium ion secondary battery was produced and evaluated in the same manner as in Example 1 except that the amount of acetylene black with respect to 100 parts of the negative electrode active material was changed to 9 parts in the aforementioned step (1-3), and that the amount of ion exchanged water was adjusted such that the final solid content concentration in the negative electrode slurry composition became 46% in the aforementioned step (1-3).

Example 4

A lithium ion secondary battery was produced and evaluated in the same manner as in Example 1 except that ketjen black with a specific surface area of 880 m$^2$/g was used as the conductive material in place of acetylene black in the aforementioned step (1-3), and that the amount of ion exchanged water was adjusted such that the final solid content concentration in the negative electrode slurry composition became 51% in the aforementioned step (1-3).

Example 5

A lithium ion secondary battery was produced and evaluated in the same manner as in Example 1 except that "BS-H" manufactured by Daiichi Kogyo Seiyaku Co., Ltd. (viscosity of 1 wt % aqueous solution: 800 mPa·s) was used in place of "MAC-200HC" manufactured by Nippon Paper Chemicals Co., Ltd. as the carboxymethyl cellulose in the aforementioned step (1-3), and that the amount of ion exchanged water was adjusted such that the final solid content concentration in the negative electrode slurry composition became 58% in the aforementioned step (1-3).

Example 6

A lithium ion secondary battery was produced and evaluated in the same manner as in Example 1 except that "Daicel 2200" manufactured by Daicel FineChem Ltd. (viscosity of 1 wt % aqueous solution: 2300 mPa·s) was used in place of "MAC-200HC" manufactured by Nippon Paper Chemicals Co., Ltd. as the carboxymethyl cellulose in the aforementioned step (1-3), and that the amount of ion exchanged water was adjusted such that the final solid content concentration in the negative electrode slurry composition became 50% in the aforementioned step (1-3).

Example 7

A lithium ion secondary battery was produced and evaluated in the same manner as in Example 1 except that the amount of butyl acrylate was changed to 96.7 parts and the amount of methacrylic acid was changed to 0.3 parts in the aforementioned step (1-1), and that the amount of ion exchanged water was adjusted such that the final solid content concentration in the negative electrode slurry composition became 52% in the aforementioned step (1-3). The number average particle diameter of the particulate binder A was 250 nm, and the glass transition temperature was −37° C.

Example 8

A lithium ion secondary battery was produced and evaluated in the same manner as in Example 1 except that the amount of butyl acrylate was changed to 93.5 parts and the amount of methacrylic acid was changed to 3.5 parts in the aforementioned step (1-1), and that the amount of ion exchanged water was adjusted such that the final solid content concentration in the negative electrode slurry composition became 54% in the aforementioned step (1-3). The number average particle diameter of the particulate binder A was 250 nm, and the glass transition temperature was −26° C.

Example 9

A lithium ion secondary battery was produced and evaluated in the same manner as in Example 1 except that the amount of the particulate binder A with respect to 100 parts of the negative electrode active material was changed to 0.2 parts and the amount of the particulate binder B with respect to 100 parts of the negative electrode active material was changed to 1.8 parts in the aforementioned step (1-3), and that the amount of ion exchanged water was adjusted such that the final solid content concentration in the negative electrode slurry composition became 54% in the aforementioned step (1-3).

Example 10

A lithium ion secondary battery was produced and evaluated in the same manner as in Example 1 except that the amount of the particulate binder A with respect to 100 parts of the negative electrode active material was changed to 0.6 parts and the amount of the particulate binder B with respect to 100 parts of the negative electrode active material was changed to 1.4 parts in the aforementioned step (1-3), and the amount of ion exchanged water was adjusted such that the final solid content concentration in the negative electrode slurry composition became 51% in the aforementioned step (1-3).

Example 11

A lithium ion secondary battery was produced and evaluated in the same manner as in Example 1 except that the amount of 1,3-butadiene was changed to 34 parts, the amount of itaconic acid was changed to 1.5 parts, and the amount of styrene was changed to 63.5 parts in the aforementioned step (1-2), and that the amount of ion exchanged water was adjusted such that the final solid content concentration in the negative electrode slurry composition became 52% in the aforementioned step (1-3). The number average particle diameter of the particulate binder B was 150 nm, and the glass transition temperature was 7° C.

Example 12

A lithium ion secondary battery was produced and evaluated in the same manner as in Example 1 except that the amount of 1,3-butadiene was changed to 32 parts, the amount of itaconic acid was changed to 5 parts, and the amount of styrene was changed to 62 parts in the aforementioned step (1-2), and that the amount of ion exchanged water was adjusted such that the final solid content concentration in the negative electrode slurry composition became 55% in the aforementioned step (1-3). The number average particle diameter of the particulate binder B was 150 nm, and the glass transition temperature was 14° C.

Example 13

A lithium ion secondary battery was produced and evaluated in the same manner as in Example 1 except that a combination of about 90 parts of artificial graphite and 10 parts of SiOx having a specific surface area of 6.1 $m^2/g$ (manufactured by Shin-Etsu Chemical Co. Ltd., volume average particle diameter: 4.2 μm) was used as the negative electrode active material in the aforementioned step (1-3), and that the amount of ion exchanged water was adjusted such that the final solid content concentration in the negative electrode slurry composition became 51% in the aforementioned step (1-3).

Example 14

A lithium ion secondary battery was produced and evaluated in the same manner as in Example 1 except that a combination of about 70 parts of artificial graphite and 30 parts of SiOx having a specific surface area of 6.1 $m^2/g$ (manufactured by Shin-Etsu Chemical Co. Ltd., volume average particle diameter: 4.2 μm) was used as the negative electrode active material in the aforementioned step (1-3), and that the amount of ion exchanged water was adjusted such that the final solid content concentration in the negative electrode slurry composition became 49% in the aforementioned step (1-3).

Example 15

A lithium ion secondary battery was produced and evaluated in the same manner as in Example 1 except that the amount of the negative electrode slurry composition applied was changed such that the amount of the solid content on the current collector after the negative electrode slurry composition applied was dried was 12 $mg/cm^2$ in the aforementioned step (1-4).

Example 16

A lithium ion secondary battery was produced and evaluated in the same manner as in Example 1 except that the amount of the negative electrode slurry composition applied was changed such that the amount of the solid content on the current collector after the negative electrode slurry composition applied was dried was 18 $mg/cm^2$ in the aforementioned step (1-4).

Comparative Example 1

A lithium ion secondary battery was produced and evaluated in the same manner as in Example 1 except that the aqueous dispersion containing the particulate binder A was not used and the amount of the particulate binder B with respect to 100 parts of the negative electrode active material was changed to 2 parts in the aforementioned step (1-3), and that the amount of ion exchanged water was adjusted such that the final solid content concentration in the negative electrode slurry composition became 54% in the aforementioned step (1-3).

Comparative Example 2

A lithium ion secondary battery was produced and evaluated in the same manner as in Example 1 except that the aqueous dispersion containing the particulate binder B was not used and the amount of the particulate binder A with respect to 100 parts of the negative electrode active material was changed to 2 parts in the aforementioned step (1-3), and that the amount of ion exchanged water was adjusted such that the final solid content concentration in the negative electrode slurry composition became 48% in the aforementioned step (1-3).

Comparative Example 3

A lithium ion secondary battery was produced and evaluated in the same manner as in Example 1 except that the amount of 1,3-butadiene was changed to 31 parts, the amount of itaconic acid was changed to 6.5 parts, and 2-hydroxyethyl acrylate was not used in the aforementioned step (1-2), and that the amount of ion exchanged water was adjusted such that the final solid content concentration in the negative electrode slurry composition became 56% in the aforementioned step (1-3). The number average particle diameter of the particulate binder B was 150 nm, and the glass transition temperature was 19° C.

Comparative Example 4

A lithium ion secondary battery was produced and evaluated in the same manner as in Example 1 except that itaconic acid was used in place of methacrylic acid in the aforementioned step (1-1), and that the amount of ion exchanged water was adjusted such that the final solid content concentration in the negative electrode slurry composition became 55% in the aforementioned step (1-3). The number average particle diameter of the particulate binder A was 350 nm, and the glass transition temperature was −27° C.

Comparative Example 5

A lithium ion secondary battery was produced and evaluated in the same manner as in Example 1 except that the amount of butyl acrylate was changed to 92.5 parts and 4.5 parts of itaconic acid was used in place of 2 parts of methacrylic acid in the aforementioned step (1-1), that the amount of 1,3-butadiene was changed to 35.5 parts and the amount of itaconic acid was changed to 1 part in the aforementioned step (1-2), and that the amount of ion exchanged water was adjusted such that the final solid content concentration in the negative electrode slurry composition became 54% in the aforementioned step (1-3). The number average particle diameter of the particulate binder A was 280 nm, and the glass transition temperature was −25° C. The number average particle diameter of the particulate binder B was 150 nm, and the glass transition temperature was 5° C.

[Results]

The configurations of the Examples and Comparative Examples that have been described are shown in the following Tables 1 to 6, and the results are shown in Tables 7 and 8. In the following tables, the meanings of abbreviations are as follows. In addition, in the following tables, a value next to the abbreviation of a monomer represents the amount of the monomer.

AB: acetylene black
KB: Ketjen black
Monomer I: ethylenically unsaturated monocarboxylic acid monomer
  MAA: methacrylic acid
  BA: butyl acrylate
  AN: acrylonitrile
  AMA: allyl methacrylate Monomer II: ethylenically unsaturated dicarboxylic acid monomer
  IA: itaconic acid
  ST: styrene
  BD: 1,3-butadiene
  β-HEA: 2-hydroxyethyl acrylate Slurry concentration: final solid content concentration of negative electrode slurry composition
Slurry viscosity: viscosity of negative electrode slurry composition immediately after production
Binder weight ratio A/B: weight ratio of particulate binder A/particulate binder B
Amount of binder: total amount of particulate binder A and particulate binder B
Volume resistivity: penetration-type volume resistivity of negative electrode
Application amount: amount of solid content on current collector per unit surface area of current collector after negative electrode slurry composition is applied and dried
$\Delta\eta$: temporal change rate in slurry viscosity
$P_B$: peel strength of pre-press negative electrode
$P_A$: peel strength of pressed negative electrode
$\Delta d$: swelling rate of negative electrode
$\Delta C$: capacity retention rate of battery
$\Delta V$: change in voltage of battery

TABLE 1

| | | [Configurations of Examples 1 to 4] | | | |
|---|---|---|---|---|---|
| | | Ex. 1 | Ex. 2 | Ex. 3 | Ex. 4 |
| Slurry composition | | | | | |
| Negative electrode active material | Type | Graphite | Graphite | Graphite | Graphite |
| | Amount (parts) | 100 | 100 | 100 | 100 |
| Conductive material | Type | AB | AB | AB | KB |
| | Amount (parts) | 2 | 0.15 | 9 | 2 |
| | Spec surface area (m$^2$/g) | 75 | 75 | 75 | 880 |
| Water soluble polymer | 1% aqueous solution viscosity | 1880 mPa·s | 1880 mPa·s | 1880 mPa·s | 1880 mPa·s |
| | Type | MAC200HC | MAC200HC | MAC200HC | MAC200HC |
| | Amount (parts) | 1 | 1 | 1 | 1 |
| Particulate binder A | Surface acid amount | 0.08 meq/g | 0.08 meq/g | 0.08 meq/g | 0.08 meq/g |
| | Type of monomer I | MAA | MAA | MAA | MAA |
| | Amount of monomer I (parts) | 2 | 2 | 2 | 2 |
| | Other monomer | BA 95 AN 2 AMA 1 | BA 95 AN 2 AMA 1 | BA 95 AN 2 AMA 1 | BA 95 AN 2 AMA 1 |
| Particulate binder B | Surface acid amount | 0.29 meq/g | 0.29 meq/g | 0.29 meq/g | 0.29 meq/g |
| | Type of monomer II | IA | IA | IA | IA |
| | Amount of monomer II (parts) | 3.5 | 3.5 | 3.5 | 3.5 |
| | Other monomer | ST 62.5 BD 33.0 β-HEA 1.0 | ST 62.5 BD 33.0 β-HEA 1.0 | ST 62.5 BD 33.0 β-HEA 1.0 | ST 62.5 BD 33.0 β-HEA 1.0 |
| | Binder weight ratio A/B | 0.25 (=20/80) | 0.25 (=20/80) | 0.25 (=20/80) | 0.25 (=20/80) |
| | Amount of binder (parts) | 2 | 2 | 2 | 2 |
| | Slurry concentration (wt %) | 53 | 54 | 46 | 51 |

TABLE 1-continued

| [Configurations of Examples 1 to 4] | | | | |
|---|---|---|---|---|
| | Ex. 1 | Ex. 2 | Ex. 3 | Ex. 4 |
| Slurry viscocity (mPa · s) | 3400 | 3200 | 3780 | 3200 |
| Negative electrode | | | | |
| Volume resistivity | $9.5 \times 10^{-3}$ Ω · cm | $9.5 \times 10^{-2}$ Ω · cm | $8.2 \times 10^{-5}$ Ω · cm | $4.2 \times 10^{-3}$ Ω · cm |
| Application amount | 16 mg/cm$^2$ | 16 mg/cm$^2$ | 16 mg/cm$^2$ | 16 mg/cm$^2$ |

TABLE 2

| [Configurations of Examples 5 to 8] | | | | | |
|---|---|---|---|---|---|
| | | Ex. 5 | Ex. 6 | Ex. 7 | Ex. 8 |
| Slurry composition | | | | | |
| Negative electrode active material | Type | Graphite | Graphite | Graphite | Graphite |
| | Amount (parts) | 100 | 100 | 100 | 100 |
| Conductive material | Type | AB | AB | AB | AB |
| | Amount (parts) | 2 | 2 | 2 | 2 |
| | Spec surface area (m$^2$/g) | 75 | 75 | 75 | 75 |
| Water soluble polymer | 1% aqueous solution viscosity | 800 mPa · s | 2300 mPa · s | 1880 mPa · s | 1880 mPa · s |
| | Type | BS-H | Daicel 2200 | MAC200HC | MAC200HC |
| | Amount (parts) | 1 | 1 | 1 | 1 |
| Particulate binder A | Surface acid amount | 0.08 meq/g | 0.08 meq/g | 0.02 meq/g | 0.097 meq/g |
| | Type of monomer I | MAA | MAA | MAA | MAA |
| | Amount of monomer I (parts) | 2 | 2 | 0.3 | 3.5 |
| | Other monomer | BA 95<br>AN 2<br>AMA 1 | BA 95<br>AN 2<br>AMA 1 | BA 96.7<br>AN 2<br>AMA 1 | BA 93.5<br>AN 2<br>AMA 1 |
| Particulate binder B | Surface acid amount | 0.29 meq/g | 0.29 meq/g | 0.29 meq/g | 0.29 meq/g |
| | Type of monomer II | IA | IA | IA | IA |
| | Amount of monomer II (parts) | 3.5 | 3.5 | 3.5 | 3.5 |
| | Other monomer | ST 62.5<br>BD 33.0<br>β-HEA 1.0 | ST 62.5<br>BD 33.0<br>β-HEA 1.0 | ST 62.5<br>BD 33.0<br>β-HEA 1.0 | ST 62.5<br>BD 33.0<br>β-HEA 1.0 |
| Binder weight ratio A/B | | 0.25 (=20/80) | 0.25 (=20/80) | 0.25 (=20/80) | 0.25 (=20/80) |
| Amount of binder (parts) | | 2 | 2 | 2 | 2 |
| Slurry concentration (wt %) | | 58 | 50 | 52 | 54 |
| Slurry viscocity (mPa · s) | | 3100 | 3200 | 3780 | 3890 |
| Negative electrode | | | | | |
| Volume resistivity | | $6.5 \times 10^{-2}$ Ω · cm | $2.2 \times 10^{-2}$ Ω · cm | $1.9 \times 10^{-2}$ Ω · cm | $7.3 \times 10^{-2}$ Ω · cm |
| Application amount | | 16 mg/cm$^2$ | 16 mg/cm$^2$ | 16 mg/cm$^2$ | 16 mg/cm$^2$ |

TABLE 3

[Configurations of Examples 9 to 12]

|  |  | Ex. 9 | Ex. 10 | Ex. 11 | Ex. 12 |
|---|---|---|---|---|---|
| Slurry composition |  |  |  |  |  |
| Negative electrode active material | Type | Graphite | Graphite | Graphite | Graphite |
|  | Amount (parts) | 100 | 100 | 100 | 100 |
| Conductive material | Type | AB | AB | AB | AB |
|  | Amount (parts) | 2 | 2 | 2 | 2 |
|  | Spec surface area (m²/g) | 75 | 75 | 75 | 75 |
| Water soluble polymer | 1% aqueous solution viscosity | 1880 mPa·s | 1880 mPa·s | 1880 mPa·s | 1880 mPa·s |
|  | Type | MAC200HC | MAC200HC | MAC200HC | MAC200HC |
|  | Amount (parts) | 1 | 1 | 1 | 1 |
| Particulate binder A | Surface acid amount | 0.08 meq/g | 0.08 meq/g | 0.08 meq/g | 0.08 meq/g |
|  | Type of monomer I | MAA | MAA | MAA | MAA |
|  | Amount of monomer I (parts) | 2 | 2 | 2 | 2 |
|  | Other monomer | BA 95<br>AN 2<br>AMA 1 | BA 95<br>AN 2<br>AMA 1 | BA 95<br>AN 2<br>AMA 1 | BA 95<br>AN 2<br>AMA 1 |
| Particulate binder B | Surface acid amount | 0.29 meq/g | 0.29 meq/g | 0.16 meq/g | 0.47 meq/g |
|  | Type of monomer II | IA | IA | IA | IA |
|  | Amount of monomer II (parts) | 3.5 | 3.5 | 1.5 | 5 |
|  | Other monomer | ST 62.5<br>BD 33.0<br>β-HEA 1.0 | ST 62.5<br>BD 33.0<br>β-HEA 1.0 | ST 63.5<br>BD 34.0<br>β-HEA 1.0 | ST 62.0<br>BD 32.0<br>β-HEA 1.0 |
| Binder weight ratio A/B |  | 0.11 (=10/90) | 0.43 (=30/70) | 0.25 (=20/80) | 0.25 (=20/80) |
| Amount of binder (parts) |  | 2 | 2 | 2 | 2 |
| Slurry concentration (wt %) |  | 54 | 51 | 52 | 55 |
| Slurry viscocity (mPa·s) |  | 3880 | 3650 | 3200 | 3580 |
| Negative electrode |  |  |  |  |  |
| Volume resistivity |  | $4.5 \times 10^{-2}$ Ω·cm | $2.8 \times 10^{-3}$ Ω·cm | $1.1 \times 10^{-2}$ Ω·cm | $6.1 \times 10^{-2}$ Ω·cm |
| Application amount |  | 16 mg/cm² | 16 mg/cm² | 16 mg/cm² | 16 mg/cm² |

TABLE 4

[Configurations of Examples 13 to 16]

|  |  | Ex. 13 | Ex. 14 | Ex. 15 | Ex. 16 |
|---|---|---|---|---|---|
| Slurry composition |  |  |  |  |  |
| Negative electrode active material | Type | Graphite/SiOx 90/10 | Graphite/SiOx 70/30 | Graphite | Graphite |
|  | Amount (parts) | 100 | 100 | 100 | 100 |
| Conductive material | Type | AB | AB | AB | AB |
|  | Amount (parts) | 2 | 2 | 2 | 2 |
|  | Spec surface area (m²/g) | 75 | 75 | 75 | 75 |
| Water soluble polymer | 1% aqueous solution viscosity | 1880 mPa·s | 1880 mPa·s | 1880 mPa·s | 1880 mPa·s |
|  | Type | MAC200HC | MAC200HC | MAC200HC | MAC200HC |

TABLE 4-continued

[Configurations of Examples 13 to 16]

| | | Ex. 13 | Ex. 14 | Ex. 15 | Ex. 16 |
|---|---|---|---|---|---|
| Particulate binder A | Amount (parts) | 1 | 1 | 1 | 1 |
| | Surface acid amount | 0.08 meq/g | 0.08 meq/g | 0.08 meq/g | 0.08 meq/g |
| | Type of monomer I | MAA | MAA | MAA | MAA |
| | Amount of monomer I (parts) | 2 | 2 | 2 | 2 |
| | Other monomer | BA 95<br>AN 2<br>AMA 1 | BA 95<br>AN 2<br>AMA 1 | BA 95<br>AN 2<br>AMA 1 | BA 95<br>AN 2<br>AMA 1 |
| Particulate binder B | Surface acid amount | 0.29 meq/g | 0.29 meq/g | 0.29 meq/g | 0.29 meq/g |
| | Type of monomer II | IA | IA | IA | IA |
| | Amount of monomer II (parts) | 3.5 | 3.5 | 3.5 | 3.5 |
| | Other monomer | ST 62.5<br>BD 33.0<br>β-HEA 1.0 | ST 62.5<br>BD 33.0<br>β-HEA 1.0 | ST 62.5<br>BD 33.0<br>β-HEA 1.0 | ST 62.5<br>BD 33.0<br>β-HEA 1.0 |
| Binder weight ratio A/B | | 0.25 (=20/80) | 0.25 (=20/80) | 0.25 (=20/80) | 0.25 (=20/80) |
| Amount of binder (parts) | | 2 | 2 | 2 | 2 |
| Slurry concentration (wt %) | | 51 | 49 | 53 | 53 |
| Slurry viscocity (mPa·s) | | 3790 | 3890 | 3400 | 3400 |
| Negative electrode | | | | | |
| Volume resistivity | | 3.5 Ω·cm | 7.2 Ω·cm | $4.2 \times 10^{-3}$ Ω·cm | $3.5 \times 10^{-2}$ Ω·cm |
| Application amount | | 16 mg/cm$^2$ | 16 mg/cm$^2$ | 12 mg/cm$^2$ | 18 mg/cm$^2$ |

TABLE 5

[Configurations of Comparative Examples 1 to 4]

| | | Comp. Ex. 1 | Comp. Ex. 2 | Comp. Ex. 3 | Comp. Ex. 4 |
|---|---|---|---|---|---|
| Slurry composition | | | | | |
| Negative electrode active material | Type | Graphite | Graphite | Graphite | Graphite |
| | Amount (parts) | 100 | 100 | 100 | 100 |
| Conductive material | Type | AB | AB | AB | AB |
| | Amount (parts) | 2 | 2 | 2 | 2 |
| | Spec surface area (m$^2$/g) | 75 | 75 | 75 | 75 |
| Water soluble polymer | 1% aqueous solution viscosity | 1880 mPa·s | 1880 mPa·s | 1880 mPa·s | 1880 mPa·s |
| | Type | MAC200HC | MAC200HC | MAC200HC | MAC200HC |
| | Amount (parts) | 1 | 1 | 1 | 1 |
| Particulate binder A | Surface acid amount | — | 0.08 meq/g | 0.08 meq/g | 0.2 meq/g |
| | Type of monomer I | — | MAA | MAA | IA |
| | Amount of monomer I (parts) | — | 2 | 2 | 2 |
| | Other monomer | — | BA 95<br>AN 2<br>AMA 1 | BA 95<br>AN 2<br>AMA 1 | BA 95<br>AN 2<br>AMA 1 |
| Particulate binder B | Surface acid amount | 0.29 meq/g | — | 0.6 meq/g | 0.29 meq/g |
| | Type of monomer II | IA | — | IA | IA |

TABLE 5-continued

[Configurations of Comparative Examples 1 to 4]

|  | Comp. Ex. 1 | Comp. Ex. 2 | Comp. Ex. 3 | Comp. Ex. 4 |
|---|---|---|---|---|
| Amount of monomer II (parts) | 3.5 | — | 6.5 | 3.5 |
| Other monomer | ST 62.5<br>BD 33.0<br>β-HEA 1.0 | — | ST 62.5<br>BD 31.0 | ST 62.5<br>BD 33.0<br>β-HEA 1.0 |
| Binder weight ratio A/B | — | — | 0.25<br>(=20/80) | 0.25<br>(=20/80) |
| Amount of binder (parts) | 2 | 2 | 2 | 2 |
| Slurry concentration (wt %) | 54 | 48 | 56 | 55 |
| Slurry viscocity (mPa · s) | 3900 | 3640 | 3870 | 3780 |
| Negative electrode |  |  |  |  |
| Volume resistivity | $8.2 \times 10^{+1}$ Ω · cm | $5.7 \times 10^{+1}$ Ω · cm | $6.6 \times 10^{+1}$ Ω · cm | $1.8 \times 10^{+1}$ Ω · cm |
| Application amount | 16 mg/cm$^2$ | 16 mg/cm$^2$ | 16 mg/cm$^2$ | 16 mg/cm$^2$ |

TABLE 6

[Configurations of Comparative Example 5]

|  |  | Comp. Ex. 5 |
|---|---|---|
| Slurry composition |  |  |
| Negative electrode active material | Type | Graphite |
|  | Amount (parts) | 100 |
| Conductive material | Type | AB |
|  | Amount (parts) | 2 |
|  | Spec surface area (m$^2$/g) | 75 |
| Water soluble polymer | 1% aqueous solution viscosity | 1880 mPa · s |
|  | Type | MAC200HC |
|  | Amount (parts) | 1 |
| Particulate binder A | Surface acid amount | 0.13 meq/g |
|  | Type of monomer I | IA |
|  | Amount of monomer I (parts) | 4.5 |
|  | Other | BA 92.5 |
| Particulate binder B | monomer | AN 2<br>AMA 1 |
|  | Surface acid amount | 0.12 meq/g |
|  | Type of monomer II | IA |
|  | Amount of monomer II (parts) | 1 |
|  | Other monomer | ST 62.5<br>BD 35.5<br>β-HEA 1.0 |
| Binder weight ratio A/B |  | 0.25<br>(=20/80) |
| Amount of binder (parts) |  | 2 |
| Slurry concentration (wt %) |  | 54 |
| Slurry viscosity (mPa · s) |  | 3560 |
| Negative electrode |  |  |
| Volume resistivity |  | $1.7 \times 10^{+1}$ Ω · cm |
| Application amount |  | 16 mg/cm$^2$ |

TABLE 7

[Results of Examples 1 to 10]

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Δη (%) | 115 | 105 | 135 | 145 | 110 | 120 | 125 | 105 | 105 | 135 |
| $P_B$ (N/m) | 5.7 | 6.5 | 5 | 4.7 | 4.1 | 6.7 | 5.4 | 6.1 | 4.8 | 6.5 |
| $P_A$ (N/m) | 12.5 | 13.3 | 11.6 | 10.6 | 10.1 | 13.1 | 12.6 | 12.9 | 8.5 | 13 |
| Δd (%) | 23.1 | 22.5 | 24.8 | 24.1 | 25.5 | 21.6 | 22.5 | 23.8 | 22.1 | 25.5 |
| ΔC (%) | 87.5 | 90.5 | 86.9 | 85.5 | 84.6 | 88.7 | 86.1 | 85 | 90.5 | 84.2 |
| ΔV (mV) | 215 | 255 | 180 | 147 | 228 | 201 | 240 | 180 | 225 | 155 |

TABLE 8

[Results of Examples 11 to 16 and Comparative Examples 1 to 5]

|  | Ex. 11 | Ex. 12 | Ex. 13 | Ex. 14 | Ex. 15 | Ex. 16 | Comp. Ex. 1 | Comp. Ex. 2 | Comp. Ex. 3 | Comp. Ex. 4 | Comp. Ex. 5 |
|---|---|---|---|---|---|---|---|---|---|---|---|
| $\Delta\eta$ (%) | 125 | 105 | 135 | 145 | 115 | 115 | 155 | 229 | 145 | 205 | 195 |
| $P_B$ (N/m) | 5.5 | 7.5 | 5.2 | 4.1 | 7.2 | 4.4 | 2.5 | 1.8 | 2.9 | 2.8 | 3.2 |
| $P_A$ (N/m) | 12 | 14.1 | 9.8 | 8.5 | 14.3 | 8.1 | 5.8 | 3.5 | 6.1 | 5.6 | 6.2 |
| $\Delta d$ (%) | 24.5 | 21.6 | 29.5 | 31.8 | 20.9 | 24.8 | 35.5 | 38.5 | 34.2 | 32.7 | 32.9 |
| $\Delta C$ (%) | 85.9 | 86.8 | 82.5 | 80.9 | 90.4 | 84.2 | 73.5 | 67.5 | 73.3 | 74.9 | 75.6 |
| $\Delta V$ (mV) | 235 | 180 | 210 | 245 | 185 | 246 | 355 | 370 | 385 | 360 | 329 |

DISCUSSION

As can be seen from the foregoing tables, a higher capacity retention rate and a smaller voltage change were obtained in all the Examples than in the Comparative Examples. Therefore, it was confirmed from the foregoing Examples and Comparative Examples that, according to the present invention, a lithium ion secondary battery excellent in cycle property and low-temperature output property can be realized.

The invention claimed is:

1. A slurry composition for a lithium ion secondary battery negative electrode, the slurry composition comprising a negative electrode active material, a conductive material, a water-soluble polymer, and a particulate binder, wherein
   an amount of the conductive material with respect to 100 parts by weight of the negative electrode active material is 0.1 parts by weight to 10 parts by weight,
   the water-soluble polymer has a 1% aqueous solution viscosity of 10 mPa·s to 3,000 mPa·s, and
   the particulate binder contains a particulate binder A having a surface acid amount of 0.01 meq/g or more and 0.10 meq/g or less and a particulate binder B having a surface acid amount of 0.15 meq/g or more and 0.5 meq/g or less.

2. The slurry composition for a lithium ion secondary battery negative electrode according to claim 1, wherein the negative electrode active material is at least one selected from the group consisting of graphite and silicon-containing compounds.

3. The slurry composition for a lithium ion secondary battery negative electrode according to claim 1, wherein the conductive material has a specific surface area of 50 m²/g to 1,500 m²/g.

4. The slurry composition for a lithium ion secondary battery negative electrode according to claim 1, wherein the water-soluble polymer contains carboxymethyl cellulose.

5. The slurry composition for a lithium ion secondary battery negative electrode according to claim 1, wherein the particulate binder A contains 0.1% by weight to 10% by weight of an ethylenically unsaturated monocarboxylic acid monomer unit.

6. The slurry composition for a lithium ion secondary battery negative electrode according to claim 1, wherein the particulate binder B contains 1% by weight to 10% by weight of an ethylenically unsaturated dicarboxylic acid monomer unit.

7. The slurry composition for a lithium ion secondary battery negative electrode according to claim 1, wherein a weight ratio of the particulate binder A with respect to the particulate binder (particulate binder A)/(the particulate binder B) is 0.01 to 1.

8. The slurry composition for a lithium ion secondary battery negative electrode according to claim 1, wherein the particulate binder A has a surface acid amount of 0.01 meq/g or more and 0.097 meq/g or less.

* * * * *